(12) United States Patent
Ishisaka et al.

(10) Patent No.: US 6,472,665 B1
(45) Date of Patent: Oct. 29, 2002

(54) RADIATION IMAGE DETECTOR AND RADIATION IMAGE FORMING SYSTEM

(75) Inventors: Akira Ishisaka; Hiromu Ohara, both of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/502,576

(22) Filed: Feb. 11, 2000

(30) Foreign Application Priority Data

Feb. 12, 1999 (JP) ............................................. 11-033803
Feb. 17, 1999 (JP) ............................................. 11-038033

(51) Int. Cl.⁷ ................................................. G01T 1/20
(52) U.S. Cl. .................... 250/368; 250/487.1; 378/98.3
(58) Field of Search .............................. 250/368, 336.1, 250/361 R, 483.1, 487.1; 378/98.2, 98.3, 98.9

(56) References Cited

U.S. PATENT DOCUMENTS

| | | | |
|---|---|---|---|
| 4,503,460 A | * | 3/1985 | Sklebitz ..................... 378/98.3 |
| 5,617,463 A | * | 4/1997 | Beierlein .................... 378/98.3 |
| 6,288,399 B1 | * | 9/2001 | Andreaco et al. ........... 250/368 |

* cited by examiner

*Primary Examiner*—Huy Mai
(74) *Attorney, Agent, or Firm*—Cantor Colburn LLP

(57) ABSTRACT

A radiation image detecting device, comprises: a scintillator to emit light in accordance with an intensity of radiation energy when being irradiated with radiation; a lens array in which a plurality of lens units are arranged in a form of an array, wherein the light emitted from the scintillator passes through the lens array; a lattice to partition the lens array, wherein the plurality of lens units are arranged on the lattice; and a plurality of area sensors corresponding to the plurality of lens units of the lens array, the plurality of area sensors receiving the light having passed through the plurality of lens units and converting the light into electric signals, wherein the scintillator, the lens array and the plurality of area sensors are arranged in that order.

19 Claims, 20 Drawing Sheets

X-RAY SCINTILLATOR

←→
30mm

GRATING

←→
30mm

5 PITCHES

RADIATION IMAGE DETECTOR AND RADIATION IMAGE FORMING SYSTEM

BACKGROUND OF THE INVENTION

The present invention relates to a radiation image detector and a radiation image forming system which are used for X-ray mammography and for radiographing the chest and appendicular skeletons.

As s system used for radiographing an X-ray image for medical diagnosis, there has generally been used an image forming system wherein a silver halide photographic film is superposed closely on an X-ray intensifying screen and is exposed to an X-ray image to be developed, fixed, washed with water and dried by an automatic processor.

In the case of diagnoses by X-ray images for medical use and of non-destructive inspections, the so-called X-ray films employing a silver halide emulsion have widely been used. For diagnoses by images for medical use, in particular, a screen film system wherein an intensifying screen and an X-ray film are combined has been used for 100 years.

These image information are the so-called analog image information which make it impossible to conduct free image processing and instant electric transmission which can be conducted for digital image information which have recently been developed.

As one of digital technologies for X-ray images, computed radiography (CR) is currently accepted in the field of medical service. However, its sharpness is not enough, its spatial resolution is insufficient and it is unable to reach the level of image quality of the screen/film system. As a technology of digital X-ray image which is further new, there has been developed a flat panel X-ray detection device (FPD) employing a thin film transistor (TFT) which is described, for example, in John ROWLANDS' thesis "Amorphous Semiconductor Usher in Digital X-ray Imaging" on page 24 of Nov. issue of the magazine "Physics Today" in 1997, or in L. E. ANTONUK's thesis "Development of a High Resolution, Active Matrix, Flat-Panel Imager with Enhanced Fill Factor" on page 2 of Volume 32 of the magazine "SPIE" in 1997.

This has special features that a device is smaller and image quality is more excellent, compared with CR. However, on the other hand, it has a defect that resolution of images is as low as about 3–4 lp/mm, due to the restriction of a size of an image element owned by TFT. Further, as another X-ray digital technology, there is known a method to use an X-ray scintillator and a small number of CCDs. However, a radiation image detector employing a small number of CCDs has a weak point that it is large in size and heavy in weight.

SUMMARY OF THE INVENTION

The invention has been achieved in view of the actual circumstances stated above, and its first object is to provide a radiation image detector and a radiation image forming system wherein spatial resolution is high, image quality is high, and a thickness is small and weight is light. Further, the second object of the invention is to provide a radiation image pickup apparatus wherein it is possible to obtain an image which is free from optical distortion caused by positional deviation and/or change in size for an effective image area caused by change of ambient circumstances, mainly by change of temperature, and to process a large quantity of data rapidly.

To solve the problems stated above and to attain the objects, the invention is structured as follows.

(1-1) A radiation image detecting device, comprises: a scintillator to emit light in accordance with an intensity of radiation energy when being irradiated with radiation;
   a lens array in which a plurality of lens units are arranged in a form of an array, wherein the light emitted from the scintillator passes through the lens array;
   a lattice to partition the lens array, wherein the plurality of lens units are arranged on the lattice; and
   a plurality of area sensors corresponding to the plurality of lens units of the lens array, the plurality of area sensors receiving the light having passed through the plurality of lens units and converting the light into electric signals,
   wherein the scintillator, the lens array and the plurality of area sensors are arranged in that order.

(1-2) The radiation image detecting device of (1-1), wherein the lattice has a opaque member.

(1-3) The radiation image detecting device of (1-2), wherein a transmissivity of light having a wavelength of 400 nm to 700 nm for the lattice in not larger than 10%.

(1-4) The radiation image detecting device of (1-1), wherein the scintillator emits visible light in accordance with an intensity of radiation energy.

(1-5) The radiation image detecting device of (1-4), wherein the scintillator contains gadolium oxysulfide ($Gd_2O_2S$:Tb) or cesium iodide (CsI:Tl).

(1-6) The radiation image detecting device of (1-1), wherein each lens unit in the lens array comprises plural different lenses.

(1-7) The radiation image detecting device of (1-6), wherein a magnification of the each lens unit is 1/1.5 to 1/20.

(1-8) The radiation image detecting device of (1-6), wherein an effective F-number of the each lens unit is not larger than 8.

(1-9) The radiation image detecting device of (1-6), wherein a difference of MTF between a center and a periphery on an forming plane by the each lens unit is not larger than 30%.

(1-10) The radiation image detecting device of (1-6), wherein a half field angle of the each lens unit is not more than 35°.

(1-11) The radiation image detecting device of (1-6), wherein the each lens unit comprises a focus point adjusting device.

(1-12) The radiation image detecting device of (1-6), wherein the each lens unit contains Pb by 0.47 wt % or more and less than 69 wt % of a total weight of glass components of the each lens unit.

(1-13) The radiation image detecting device of (1-6), wherein the each lens unit contains PbO by 0.5 wt % or more and less than 75 wt % of a total weight of glass components of the each lens unit.

(1-14) The radiation image detecting device of (1-1), wherein the area sensors comprises a solid-state image acquiring unit such as a CCD or a CMOS sensor.

(1-15) The radiation image detecting device of (1-1), further comprising a transparent member provided between the scintillator and the lens array.

(1-16) The radiation image detecting device of (1-15), wherein the transparent member comprises a glass and the transparent member contains Pb by 0.47 wt % or more and less than 69 wt % of a total weight of glass components of the transparent member.

(1-17) A radiation image detecting device, comprises:
   a scintillator to emit light in accordance with an intensity of radiation energy when being irradiated with radiation;

a lens array comprising a plurality of lens unit, wherein the light emitted from the scintillator passes through the lens array; and a plurality of area sensors corresponding to the plurality of lens unit of the lens array, the plurality of area sensors receiving the light having passed through the plurality of lens units and converting the light into electric signals, wherein the scintillator, the lens array and the area sensors are arranged in this order and a focus length f (mm) of each lens unit satisfies the following formula:

$$2<f<20.$$

(1-18) A radiation image detecting apparatus, comprises:

a scintillator to emit light in accordance with an intensity of radiation energy when being irradiated with radiation;

a transparent member, wherein the light emitted from the scintillator passes through the transparent member;

a lens array comprising a plurality of lens units, wherein the light having passed through the transparent member further passes through the lens array; and a plurality of area sensors corresponding to the plurality of lens units of the lens array, the plurality of area sensors receiving the light having passed through the lens arrays and converting the light into electric signals, wherein the scintillator, the transparent member, the lens array and the plurality of area sensors are arranged in that order.

Here, it may be preferable that the apparatus described in (1-17) or (1-18) is used in combination with at least one of the structures of (1-1) to (1-16).

(1-19) A radiation image detecting apparatus, comprises:

a scintillator to emit light in accordance with an intensity of radiation energy when being irradiated with radiation;

a lens array comprising a plurality of lens units, wherein the light emitted from the scintillator passes through the lens array;

a plurality of area sensors corresponding to the plurality of lens units of the lens array, the plurality of area sensors receiving the light having passed through the lens arrays and converting the light into electric signals, and each area sensor having an effective imaging region, and correcting means for correcting the electric signals so as to correct at least one of a change in a position of the effective imaging region of each area sensor and a change in a size of the effective imaging region of each area sensor;

wherein the scintillator, the lens array and the plurality of area sensors are arranged in that order.

Also, it may be preferable that the apparatus described in (1-19) is used in combination with at least one of the structures of (1-1) to (1-18).

(1-20) The radiation image detecting apparatus of (1-19), further comprises:

a memory to store information regarding the position of the effective imaging region of each area sensor, and wherein the correcting means corrects the change in the position of the effective imaging region of each area sensor based on the information regarding the position of the effective imaging region.

(1-21) The radiation image detecting apparatus of (1-19), further comprises:

a memory to store information regarding the size of the effective imaging region of each area sensor, wherein the correcting means corrects the size of each area sensor based on the information regarding the size.

(1-22) The radiation image detecting apparatus of (1-19), wherein the correcting means corrects a change in the size of the effective imaging region of each area sensor based on the information regarding the size.

(1-23) A radiation image detecting apparatus, comprises:

a scintillator to emit light in accordance with an intensity of radiation energy when being irradiated with radiation;

a lens array comprising a plurality of lenses, wherein the light emitted from the scintillator passes through the lens array;

a plurality of area sensors corresponding to the plurality of lenses of the lens array, the plurality of area sensors receiving the light having passed through the lens array and converting the light into electric signals; and correcting means for correcting the electric signals so as to correct an optical deformation caused by each lens based on data acquired by radiographing a lattice-shaped object;

wherein the scintillator, the lens array and the plurality of area sensors are arranged in that order.

Further, the above object may be attained by the following preferable structures.

(2-1) A radiation image detector which is composed of an X-ray scintillator, a lens array and an area sensor which corresponds to each lens unit of the lens array all arranged in this order.

Since an X-ray scintillator, a lens array and an area sensor corresponding to each lens unit of the lens array are arranged in this order in the invention described in Item (2-1), spatial resolution is high, image quality is high, a thickness is small, a size is small and weight is light.

(2-2) The radiation image detector described in Item (2-1) wherein the X-ray scintillator of gadolium oxysulfide ($Gd_2O_2S$:Tb) or cesium iodide (CsI:Tl) generates visible light when it is exposed to X-rays.

Since the X-ray scintillator of gadolium oxysulfide ($Gd_2O_2S$:Tb) or cesium iodide (CsI:Tl) generates visible light when it is exposed to X-rays in the invention described in Item (2-2), spatial resolution is high and image quality is high.

(2-3) The radiation image detector described in Item (2-1) wherein the lens array is composed of a lens unit made of combination of plural different lenses in quantity of two or more.

Owing to the invention described in Item (2-3) wherein the lens array is composed of a lens unit made of combination of plural different lenses in quantity of two or more, spatial resolution is high, image quality is high, and a thickness can be made small.

(2-4) The radiation image detector described in Item (2-3) wherein magnification of the lens unit is in a range from 1/1.5 to 1/20.

In the case of the invention described in Item (2-4), magnification of the lens unit is in a range from 1/1.5 to 1/20, and when it is greater than 1/1.5, an area sensor is too big to make arrangement difficult, while when it is smaller than 1/20, a distance from the X-ray scintillator to the lens unit is long to increase a thickness of the radiation image detector.

(2-5) The radiation image detector described in Item (2-3) or Item (2-4) wherein the effective F number of the lens unit is not more than 8.

Owing to the invention described in Item (2-5) wherein the effective F number of the lens unit is not more than 8, it is possible to realize a highly sensitive detector by enhancing the light-converging efficiency.

(2-6) The radiation image detector described in either one of Items (2-3)–(2-5) wherein a difference of MTF between the center and a periphery on the image plane of the lens unit is within 30%.

Owing to the invention described in Item (2-6) wherein a difference of MTF between the center and a periphery on the image forming plane of the lens unit is within 30%, it is possible to obtain sharp and clear images. Here, "MTF" is a abbreviation of Modulation Transfer Function, a ratio of a visibility on an object surface and a visibility on an image surface when a sine curve chart is photographed, and represents a image forming performance of a lens. As to further detailed information about "MTF", the description on page 151 on the publication of Optical Technical Hand Book published by Asakura Shoten may be referred.

(2-7) The radiation image detector described in either one of Items (2-3)–(2-6) wherein a half field angle of the lens unit is not more than 35°.

Owing to the invention described in Item (2-7), wherein a half field angle of the lens unit is not more than 35°, it is possible to make a fall of a quantity of light on the periphery of an image formed by the lens unit to be less, and to raise sensitivity of a radiation image detector.

(2-8) The radiation image detector described in either one of Items (2-3)–(2-7) wherein each lens unit stated above has its own focusing means.

Owing to the invention described in Item (2-8), wherein each lens unit has its own focusing means, it is possible to obtain sharp and clear images by focusing each lens unit of the lens array by use of a spacer, correcting errors in manufacture of the lens unit and by distortion of a detector itself.

(2-9) The radiation image detector described in either one of Items (2-3)–(2-8) wherein a lens array is partitioned by a lattice and the lens unit is arranged in the lattice.

Owing to the invention described in Item (2-9) wherein a lens array is partitioned by a lattice, it is possible to enhance physical strength of a detector and to maintain sharp images for a long time. By using opaque plastics or metal as a material of the lattice, it is possible to prevent light-spreading from a lens to a lens, and to obtain sharp images.

(2-10) The radiation image detector described in either one of Items (2-3)–(2-9) wherein the lens unit contains PbO in the amount of 0.5% or more and less than 75% by weight of the total glass components of the lens unit.

Owing to the invention described in Item (2-10) wherein the lens unit contains lead oxide in the amount of 0.5% or more and less than 75%, it is possible to prevent deterioration of an area sensor caused by X-ray irradiation.

(2-11) The radiation image detector described in Item (2-1) wherein the area sensor is made up of a solid image pickup element such as CCD or CMOS sensor.

Owing to the invention described in Item (2-11) wherein a solid image pickup element such as CCD or CMOS sensor is used as the area sensor, it is possible to obtain sharp and clear images.

(2-12) The radiation image detector described in Item (2-1) wherein a transparent member is provided between the X-ray scintillator and the lens array.

Owing to the invention described in Item (2-12) wherein a transparent member is provided between the X-ray scintillator and the lens array, it is possible to prevent scratches on the X-ray scintillator caused by the lattice.

(2-13) The radiation image detector described in Item (2-1) wherein a transparent glass plate containing PbO in the amount of 0.5% or more and less than 75% is provided between the X-ray scintillator and the area sensor.

Owing to the invention described in Item (2-13) wherein the glass plate contains lead oxide in the amount of 0.5% or more and less than 75%, it is possible to prevent deterioration of the area sensor caused by X-ray irradiation.

(2-14) A radiation image forming system wherein radiation images are detected by the radiation image detector described in either one of Items (2-1)–(2-13), X-ray images are taken out of the radiation image detector as image signals, the image signals are transformed into laser beam intensity fluctuation, a silver halide photographic light-sensitive material having at least one light-sensitive silver halide emulsion layer is subjected to scanning exposure, then, development is made by using alkaline processing composition containing therein silver halide solvent to make at least a part of unexposed silver halide in the aforesaid light-sensitive silver halide emulsion layer to be diffusible silver complex, at least a part of the diffusible silver complex is transferred onto a silver depositing nucleus-containing image receiving layer to form images on the silver depositing nucleus-containing image receiving layer, and the silver depositing nucleus-containing image receiving layer is separated from a light-sensitive element after the image forming to obtain X-ray images.

X-ray images having high sharpness, high resolution and high image quality which are required, for example, for mammography and appendicular skeleton can be obtained rapidly and surely by the invention described in Item (2-14) wherein X-ray images are taken out of the radiation image detector as image signals, the image signals are transformed into laser beam intensity fluctuation, a silver halide photographic light-sensitive material having at least one light-sensitive silver halide emulsion layer is subjected to scanning exposure, then, development is made by using alkaline processing composition containing therein silver halide solvent to make at least a part of unexposed silver halide in the aforesaid light-sensitive silver halide emulsion layer to be diffusible silver complex, at least a part of the diffusible silver complex is transferred onto a silver depositing nucleus-containing image receiving layer to form images on the silver depositing nucleus-containing image receiving layer, and the silver depositing nucleus-containing image receiving layer is separated from a light-sensitive element after the image forming to obtain X-ray images.

(2-15) A radiation image pickup apparatus wherein a radiation image detector composed of an X-ray scintillator, a lens array and an area sensor corresponding to each lens unit of the lens array all arranged in this order is provided, and an effective image area rate of the area sensor is within a range from 5% to 99%.

The invention described in Item (2-15) wherein an X-ray scintillator, a lens array and an area sensor corresponding to each lens unit of the lens array are arranged in this order, makes spatial resolution and image quality to be high, and makes the apparatus to be thin in thickness, small in size and light in weight.

Further, by making an effective image area rate of each area sensor to be 99% or less, it is possible to obtain images of high resolution, even when positional deviation and/or change in size of an effective image area is caused by changes in ambient circumstances, mainly by changes in temperature. Further, by making the effective image area rate to be 5% or more, it is possible to utilize an area sensor effectively, and to prevent a fall of resolution (reduction of the number of pixels in an area sensor for a divided image area).

(2-16) The radiation image pickup apparatus described in Item (2-15) wherein the effective image area rate of each area sensor is within a range from 50% to 90%.

Owing to the invention described in Item (2-16), when the effective image area rate of each area sensor is made to be 90% or less, it is possible to obtain images of high resolution even when positional change of an effective image area and/or change in size of an effective image area is caused more severely by changes in ambient circumstances, mainly by changes in temperature. Further, by making the effective image area rate of each area sensor to be 50% or more, it is possible to utilize an area sensor more effectively, and to prevent a fall of resolution (reduction of the number of pixels in an area sensor for a divided image area).

(2-17) A radiation image pickup apparatus wherein a radiation image detector composed of an X-ray scintillator, a lens array and an area sensor corresponding to each lens unit of the lens array all arranged in this order is provided, and an image data preparing means which prepares total image data from image signals of an effective image area of each area sensor stated above is provided.

Owing to the invention described in (2-17), it is possible to obtain image data rapidly by preparing total image data by the use of only signals of an effective image area out of image signals of all image areas of each area sensor.

(2-18) A radiation image pickup apparatus wherein a radiation image detector composed of an X-ray scintillator, a lens array and an area sensor corresponding to each lens unit of the lens array all arranged in this order is provided, and an image data preparing means which prepares total image data from image signals of an area broader than the effective image area of each area sensor stated above is provided.

In the invention described in Item (2-18), by preparing the total image data by the use of signals of the area which is broader than the effective image area among total image areas on each area sensor, for example, the total image area or the area obtained by eliminating outermost several lines from the total image area, it is possible to average data and to obtain image data having less noise.

(2-19) A radiation image pickup apparatus wherein a radiation image detector composed of an X-ray scintillator, a lens array and an area sensor corresponding to each lens unit of the lens array all arranged in this order is provided, and a correction means which corrects positional change of an effective image area and/or change in size for an effective image area of each area sensor is provided.

By correcting positional change of an effective image area and/or change in size of an effective image area for the initial position in photographing in the invention described in Item (2-19), it is possible to obtain images of high resolution even when positional change of an effective image area and/or change in size of an image of the effective image area formed on an area sensor is caused by ambient circumstances, mainly by temperature.

(2-20) The radiation image pickup apparatus described in Item (2-19) wherein the radiation image detector has a correction data storage means which stores correction data prepared in advance for positional change of an effective image area and/or change in size for an effective image area, and positional change of an effective image area and/or change in size for the effective image area of each area sensor is corrected by the use of the correction data for positional change of an effective image area and/or change in size for the effective image area.

In the invention described in Item (2-20), by preparing in advance the correction data for positional change of an effective image area and/or change in size for an effective image area for correcting positional change of an effective image area and/or change in size for the effective image area, it is possible to obtain images of high resolution even when positional change of an effective image area and/or change in size of an image of the effective image area formed on an area sensor is caused by ambient circumstances, mainly by temperature.

(2-21) The radiation image pickup apparatus described in Item (2-20) wherein correction data for positional change of an effective image area and/or change in size for the effective image area are those obtained through photographing of a lattice-shaped object.

In the invention described in Item (2-21), by preparing correction data in a method wherein a lattice-shaped object is photographed for preparation of correction data, and image data obtained from the photographing are made to correspond to the image of the lattice-shaped object photographed originally, it is possible to obtain images of high resolution even when positional change of an effective image area and/or change in size of an image of the effective image area formed on an area sensor is caused by ambient circumstances, mainly by temperature.

(2-22) A radiation image pickup apparatus wherein a radiation image detector composed of an X-ray scintillator, a lens array and an area sensor corresponding to each lens unit of the lens array all arranged in this order is provided, and a correction means which corrects optical distortion caused by the lens unit is provided.

Owing to the invention described in Item (2-22), it is possible to obtain images of high resolution by correcting optical distortion caused by the lens unit, even when distortion of an image formed on an area sensor is caused.

(2-23) The radiation image pickup apparatus described in Item (2-22) wherein the radiation image detector has a correction data storage means which stores correction data prepared in advance for distortion, and optical distortion caused by the lens unit is corrected by the use of the correction data for distortion.

By preparing correction data in advance for correcting optical distortion and by correcting optical distortion by the use of correction data for image data obtained through photographing in the invention described in Item (2-23), it is possible to obtain images of high resolution even when distortion of an image formed on an area sensor is caused.

(2-24) The radiation image pickup apparatus described in Item (2-23) wherein the correction data for distortion are those obtained through photographing of a lattice-shaped object.

In the invention described in Item (2-24), by preparing correction data in a method wherein a lattice-shaped object is photographed for preparation of correction data, and image data obtained from the photographing are made to correspond to the image of the lattice-shaped object photographed originally, it is possible to obtain images of high resolution even when distortion of an image formed on an area sensor is caused by ambient circumstances, mainly by temperature.

(2-25) A radiation image pickup apparatus wherein a radiation image detector composed of an X-ray scintillator, a lens array and an area sensor corresponding to each lens unit of the lens array all arranged in this order is provided, and there are provided an irradiation field recognition means which conducts irradiation field recognition from all image data obtained by the radiation image detector and an image processing means which eliminates or compresses data outside the irradiation field.

By eliminating or compressing image data of pixels outside an irradiation field which are not necessary for diagnoses and by making an amount of total image data small in the invention described in Item (2-25), it is possible to process a large quantity of data quickly.

(2-26) A radiation image pickup apparatus wherein a radiation image detector composed of an X-ray scintillator, a lens array and an area sensor corresponding to each lens unit of the lens array all arranged in this order is provided, and there are provided a ROI recognition means which conducts ROI recognition from all image data obtained by the radiation image detector and an image processing means which eliminates or compresses data outside ROI.

By eliminating or compressing image data of pixels outside ROI which are not necessary for diagnoses and by making an amount of total image data small in the invention described in Item (2-26), it is possible to process a large quantity of data quickly.

(2-27) The radiation image pickup apparatus described in Item (2-25) or (2-26) wherein the radiation image detector prepares total image data from image signals of each area sensor, after positional change of an effective image area and/or change in size for an effective image area is corrected in each area sensor.

By superposing image data from image signals of each area sensor and by preparing total image data after positional change of an effective image area and/or change in size for an effective image area is corrected in each area sensor. in the invention described in Item (2-27), it is possible to obtain images of high resolution even when positional change of an effective image area and/or change in size of an image of the effective image area formed on an area sensor is caused by ambient circumstances, mainly by temperature.

(2-28) The radiation image pickup apparatus described in Item (2-25) or (2-26) wherein the radiation image detector prepares total image data from image signals of each area sensor, after distortion is corrected in each area sensor.

Owing to the invention described in Item (2-28), it is possible to obtain images of high resolution by superposing image data from image signals of each area sensor and by preparing total image data after distortion is corrected in each area sensor, even when distortion of an image formed on an area sensor is caused.

(2-29) The radiation image pickup apparatus described in Item (2-25) or (2-26) wherein the radiation image detector conducts irradiation field recognition processing after total image data from image signals of each area sensor is prepared.

In the invention described in Item (2-29) wherein irradiation field recognition processing is conducted after total image data from image signals of each area sensor are prepared, it is possible to process a large quantity of data rapidly by eliminating or compressing image data of pixels outside an irradiation field which are not necessary for diagnoses to make an amount of total image data small.

(2-30) The radiation image pickup apparatus described in Item (2-25) or (2-26) wherein the radiation image detector conducts ROI recognition processing after total image data from image signals of each area sensor are prepared.

In the invention described in Item (2-30) wherein ROI recognition processing is conducted after total image data from image signals of each area sensor are prepared, it is possible to process a large quantity of data rapidly by eliminating or compressing image data of pixels outside ROI which are not necessary for diagnoses to make an amount of total image data small.

(2-31) The radiation image pickup apparatus described in Item (2-25) or (2-26) wherein the radiation image detector conducts gradation processing, frequency processing and equalization processing, after irradiation field recognition processing and/or ROI recognition processing is conducted.

In the invention described in Item (2-31), it is possible to process a large quantity of data rapidly by conducting gradation processing, frequency processing and equalization processing, after irradiation field recognition processing and/or ROI recognition processing is conducted.

(2-32) The radiation image pickup apparatus described in Item (2-25) or (2-26) wherein the radiation image detector conducts ROI recognition processing after irradiation field recognition processing.

In the invention described in Item (2-32), it is possible to process a large quantity of data rapidly by conducting ROI recognition processing after conducting irradiation field recognition processing.

BRIEF DESCRIPTION OF THE DRAWING

FIGS. 10(a) and 19(b) are diagrams showing the structure of a lattice.

DETAILED DESCRIPTION OF THE PROFFERED EMBODIMENT

Figure 1:
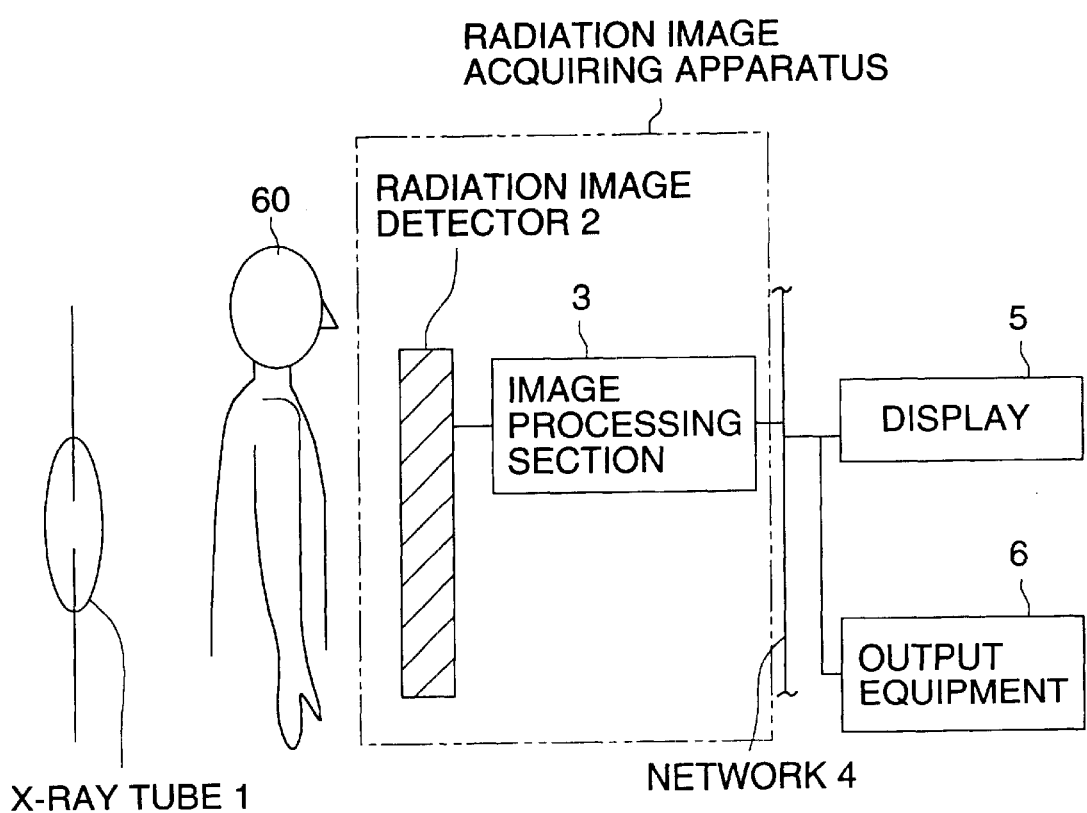
FIG. 1 is a schematic structure diagram of a radiation image forming system.

An embodiment of a radiation image detector and a radiation image forming system of the invention will be explained as follows, referring to the drawings, and it is apparent that the invention is not limited to the embodiment.

FIG. 1 is a schematic structure diagram of a radiation image forming system. The radiation image forming system radiographs object 60 by the use of X-rays emitted from X-ray tube 1, and captures X-ray images on radiation image detector 2. Then, the X-ray images are taken out of the radiation image detector 2 as image signals and are subjected to image processing conducted by image processing section 3 to be sent to network 4. To the network 4, there are connected display 5 and output equipment 6 so that X-ray images may be displayed on the display 5 such as CRT or a liquid crystal display, or X-ray images may be printed by the output equipment 6 such as a laser imager including a silver halide dry system or an ink jet printer, for outputting.

Figure 2:
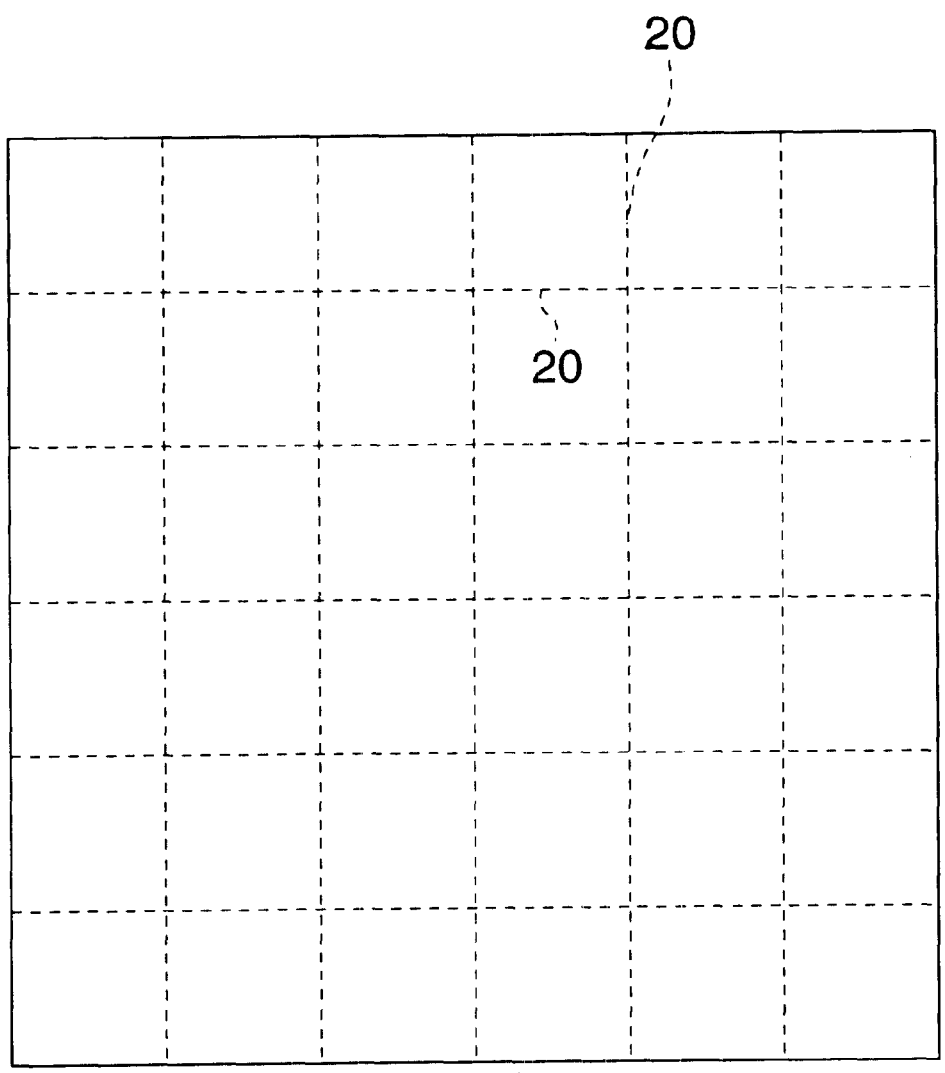
FIG. 2 is a front view of a radiation image detector.

The radiation image detector 2 is constituted as shown in FIG. 2–FIG. 5. FIG. 2 is a front view of a radiation image detector. Dotted lines in FIG. 2 are lines of lattice 20 of the radiation image detector 2, but they are actually screened by a protecting member or by an X-ray scintillator, to be invisible. Though FIG. 2 shows an example wherein the number of units is 6×6=36, the number is not limited to this.

Figure 3:
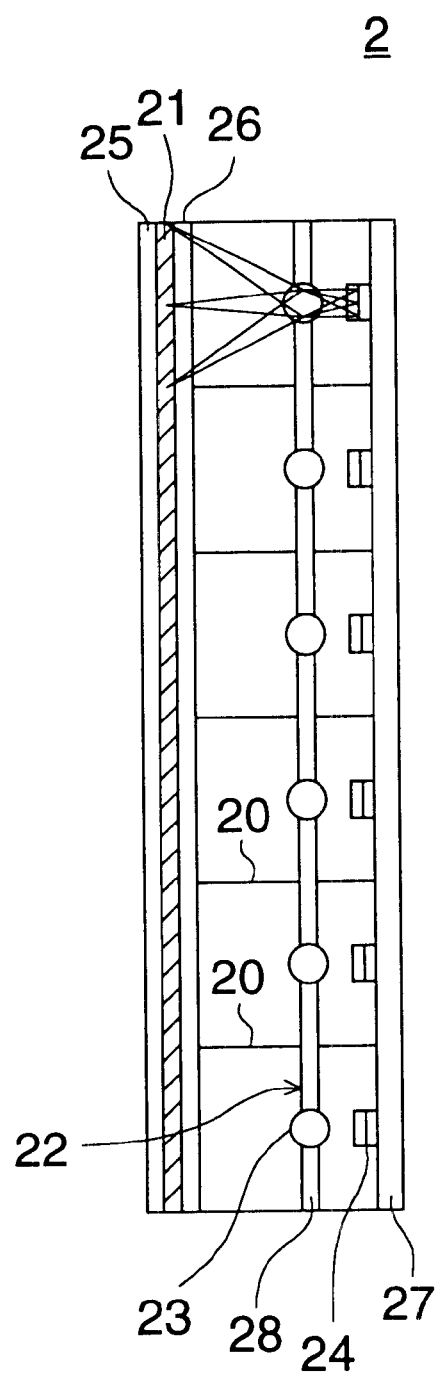
FIG. 3 is a diagram of special features of a longitudinal section of a radiation image detector.

FIG. 3 is a diagram of special features of a longitudinal section of a radiation image detector. The radiation image detector 2 is composed of X-ray scintillator 21, lens array 22 and area sensor 24 which corresponds to each lens unit 23 on the lens array 22 which are arranged in this order. The X-ray scintillator 21 is protected by protecting member 25. Each lens unit 23 on the lens array 22 is supported by lens unit supporting member 28, and radiation image detector 2 is arranged between the X-ray scintillator 21 and the lens array 22. The area sensor 24 is supported by area sensor supporting member 27.

A shape, a thickness and a light path of the radiation image detector 2 are not accurate. Lattice 20 is arranged to hit the transparent member 26 without touching the X-ray scintillator 21 directly, which avoids that the lattice 20 hits the X-ray scintillator 21 to cause scratches, and prevents that a boundary line of the lattice 20 becomes an image-missing section.

FIG. 3 is a diagram of special features of a longitudinal section of a radiation image detector. which is just an example wherein X-ray scintillator 21, lens array 22 and area sensor 24 are indispensable elements of the invention. Since the X-ray scintillator 21, the lens array 22 and the area sensor 24 corresponding to each lens unit 23 on the lens array are arranged in this order, it is possible to use a plurality of area sensors and to increase the number of pixels easily, and spatial resolution can be made high to realize high image quality accordingly. Further, a focal length can be shortened because plural area sensors are used, and thereby, the radiation image detector is thin in thickness, small in size and is light in weight.

By making $Gd_2O_2S$:Tb or CsI:Tl to be contained as a material of X-ray scintillator 21, it is possible to enhance the spatial resolution and thereby to obtain images of high image quality, because visible light is generated by the X-ray scintillator 21 when it is exposed to X-rays.

The lens array 22 is composed of a lens unit wherein two or more different lenses are combined, and due to this lens unit, aberration can easily be corrected, spatial resolution is high, image quality is high, and a thickness can be made small. The magnification of the lens unit 23 is 1/1.5–1/20, and when it is greater than 1/1.5, the area sensor is too big to cause arrangement to be difficult, while when it is smaller than 1/20, a distance from X-ray scintillator 21 to a lens unit is too long to increase a thickness of radiation image detector 2.

Figure 7:
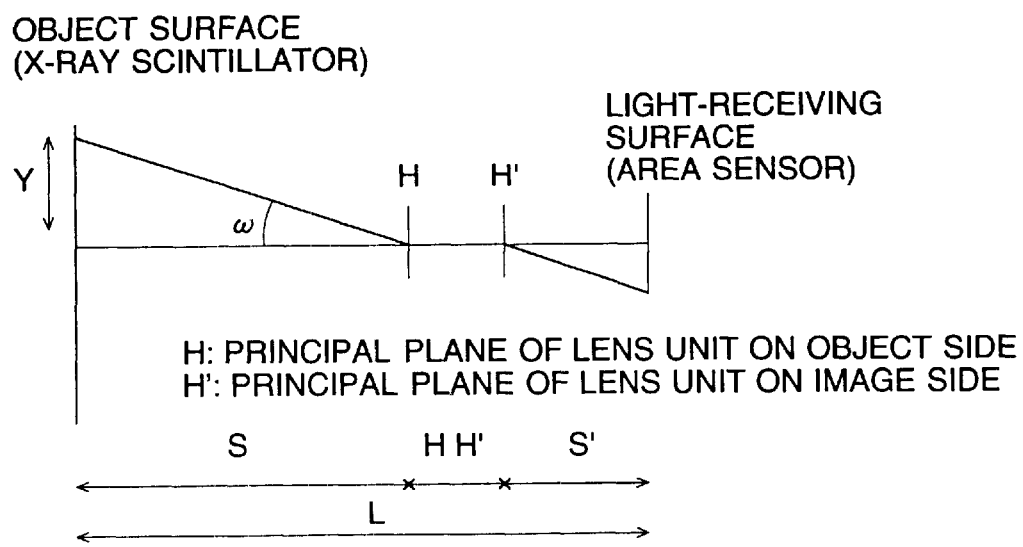
FIG. 7 is a diagram of special features of a lens unit used for a radiation image detector.

Magnification and thickness of the lens unit will be explained in detail based on a diagram of special features of the lens unit used in a radiation image detector in FIG. 7. A principal plane of the lens unit on the object side is represented by H, a principal plane of the lens unit on the image side is represented by H', and magnification M=S'/S wherein all signs are positive.

With regard to total length L in the direction of a thickness, the following expression holds;

$$L=S+HH'+S'=f(2+M+1/M)+HH'$$

wherein, f represents a focal length of a lens unit. Magnification M needs to satisfy M<1 because of arrangement of an area sensor.

Since HH' is a constant specific to the lens unit, the first term only in the above expression will be considered. A value in parentheses is minimum when M=1, and that value increases as M becomes smaller. To make the thickness smaller, therefore, it is preferable that M is closer to 1 as far as possible. However, when M is close to 1, a distance between area sensors is small, and arrangement for them is difficult. To make arrangement of area sensors to be possible and to restrain the thickness to be appropriate, it is preferable that magnification M takes a value of 1/20<M<1/1.5. More preferable is to take the value of 1/10<M<½.

To make the first term to be small, f can also be made small. However, when f is too small, design and manufacture of a lens unit are difficult. Therefore, 2<f<20 (in mm) is preferable, and more preferable is 4<f<10.

An effective F number of lens 23 is not more than 8, and by raising the light converging efficiency by making the effective F number of the lens unit to be not more than 8, it is possible to realize a highly accurate detector.

An effective F number of a lens unit is expressed by Fe=S'/Ds, wherein Ds represents an entrance pupil diameter. Since the light-collecting efficiency is determined by a field angle of the entrance pupil for the point of light emission, it is preferable to use a lens unit whose entrance pupil is large, namely, a lens unit having a small F number. In the invention, the expression of Fe<8 holds.

A difference of MTF between the center and the periphery on an image forming plane of lens unit 23 is within 30%, and when a difference of MTF between the center and the periphery on an image plane of lens unit 23 is within 30%, sharp and clear images can be obtained.

With regard to MTF of a lens, there is no problem in practical use even when there is a difference between a peripheral portion and the central portion in the case of a lens unit for a camera. In the invention, however, there is no distinction such as the center or the periphery in one unit and the total area needs to keep excellent capacity, because a number of units partitioned by lattice 20 are collected to make one sheet of image. It is therefore preferable to restrain a difference of MTF between the central portion and the peripheral portion within 30%. Due to this, it is possible to obtain an excellent image which is free from unevenness on the entire surface of a display. Incidentally, let it be assumed that MTF is for the spatial frequency corresponding to a pixel pitch of an area sensor.

A half field angle of lens unit 23 is not more than 35°, and when a half field angle of lens unit 23 is made to be 35° or less, a fall of a quantity of light on a periphery of an image formed by a lens unit is less, and sensitivity of a detector can further be raised.

With regard to brightness on an image plane of a lens unit, it gets darker on a periphery together with half field angle ω. In this case, tan ω=Y/S holds. Brightness on an image plane is expressed with a function of ω in the form of $l(\omega)=l_0 \cos \omega^4$, when $l_0$ represents brightness on the central portion. When the half field angle is larger, images in a broader range can be formed, which is preferable. However, when the half field angle is too large, a peripheral portion of a unit is dark and unevenness is caused on an image. In the invention, the half field angle is smaller than 35°. Due to this, it is possible to obtain excellent image quality which is free from unevenness on the entire area of a display. Incidentally, when a unit is rectangular or square, ω is to be calculated in the diagonal direction.

Lens array 22 is partitioned by lattice 20 on which lens unit 23 is arranged, and by partitioning the lens array 22 with the lattice 20, it is possible to raise physical strength of a detector and to maintain clear and sharp images for a long time. By using opaque plastic or metal as a material for the lattice 20, it is possible to prevent light spreading between lenses and thereby to obtain clear and sharp images.

Incidentally, for preventing deterioration of area sensor 24, it is preferable that Pb in quantity of more than 0.47% and less than 69% by weight of the total weight of lens unit 23 is contained in the lens unit 23. For example, as a glass component, PbO in quantity of 0.5% or more and less than 75% can be contained in lens unit 23. By containing lead oxide in quantity of 0.5% or more and less than 75% in lens unit 23 as a glass component, it is possible to prevent deterioration of area sensor 24 caused by X-ray irradiation.

The area sensor 24 is composed of a solid image pickup element such as a CCD or CMOS sensor, and by using a solid image pickup element such as a CCD or CMOS sensor as area sensor 24, clear and sharp images can be obtained.

A glass plate is provided between X-ray scintillator 21 and lens array 22, and by providing transparent member 26 between X-ray scintillator 21 and lens array 22, it is possible to prevent a scratch on the X-ray scintillator 21 caused by grating 20. In particular, a glass plate is preferable as a transparent member. It is a glass plate in the present embodiment. Incidentally, it is preferable in the present embodiment that the average transmission factor of the transparent member for light with wavelength of 400–700 nm is 10% or more.

A transparent glass plate containing PbO in the amount of 0.5% or more and less than 75% is provided between X-ray scintillator 21 and area sensor 24, and by making the glass plate to contain lead oxide in the amount of 0.5% or more and less than 75%, it is possible to prevent deterioration of area sensor 24 caused by X-ray irradiation.

Figure 4:
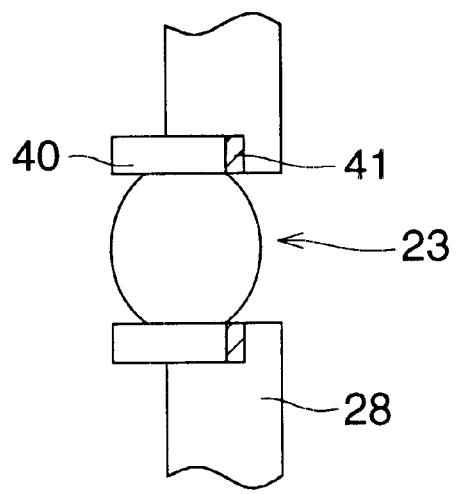
FIG. 4 is an illustration showing how a lens unit is focused by means of a spacer.
Figure 5:
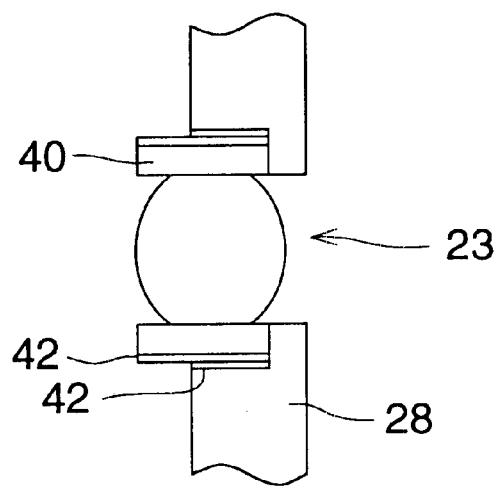
FIG. 5 is an illustration showing how focusing is conducted by means of a screw formed on a lens unit barrel.

In the present radiation image detector 2, each lens unit therein has a focusing means as shown in FIGS. 4 and 5, and FIG. 4 is an illustration wherein focusing of lens unit 23 is conducted by spacer 41. By providing spacer 41 between lens unit supporting member 28 and lens barrel 30 which is united with the lens unit supporting member 28, it is possible to conduct focusing by correcting manufacturing errors for the lens unit 23 and lens unit supporting member 28. Several kinds of the spacer 41 wherein a thickness difference between adjoining spacers is 0.01 mm are to be prepared so that an appropriate one may be used.

FIG. 5 is an illustration wherein focusing is conducted by screw 42 formed on lens unit barrel 40. The lens unit barrel 40 is fixed by adhesives at the focused position.

Focusing can be conducted while observing an image of area sensor 24 with a help of a chart located at the position of X-ray scintillator 21, and either visual observation or image processing may be used for the focusing. Since each lens unit 23 has its focusing means as stated above, focusing of each lens unit 23 of lens array 22 is conducted by the use of a spacer, and thereby clear and sharp images can be obtained.

Figure 6:
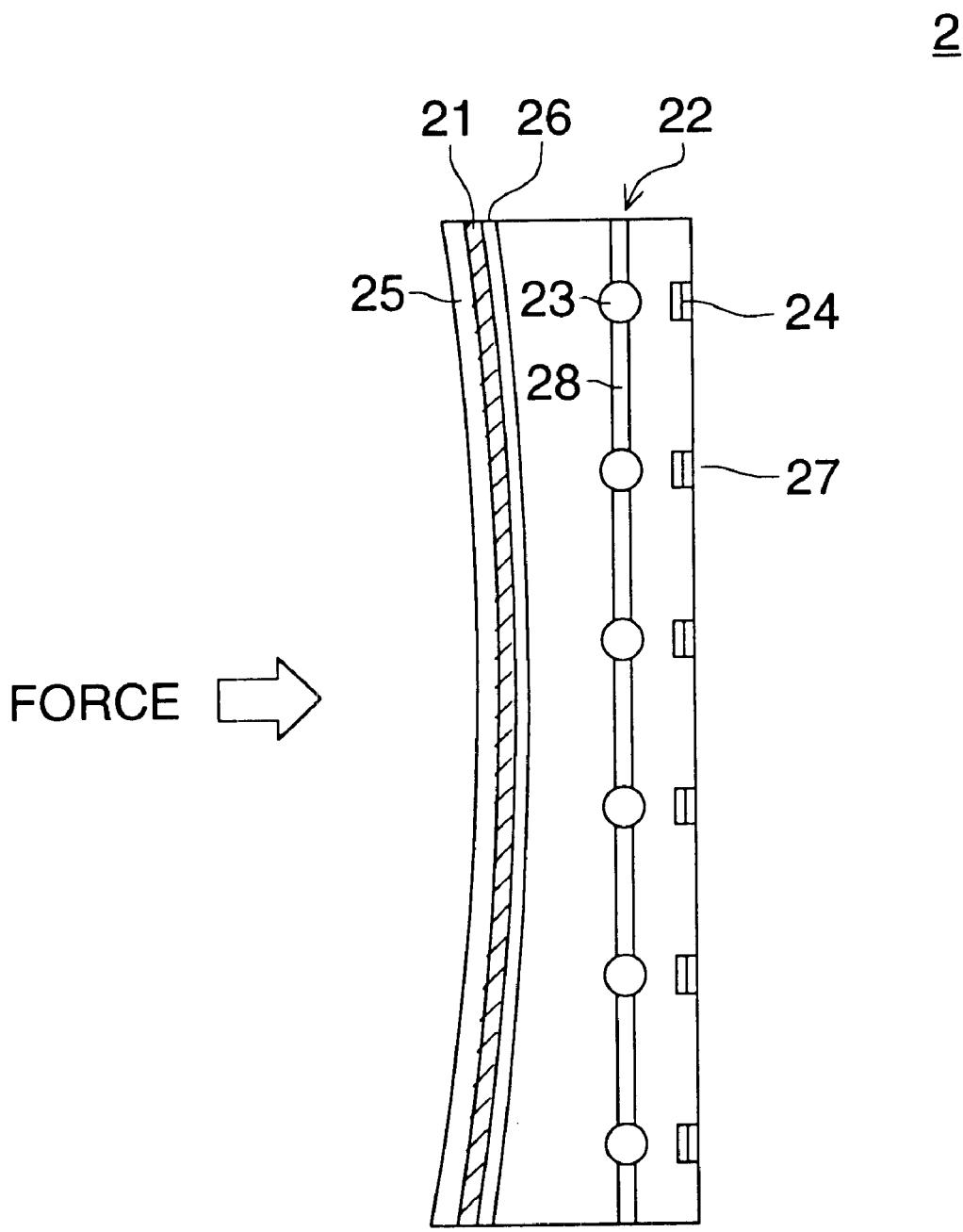
FIG. 6 is a longitudinal section wherein an X-ray scintillator section is curved when a force is applied on a radiation image detector by contact of an object in the case of no lattice.

FIG. 6 is a longitudinal section wherein an X-ray scintillator section is curved when a force is applied on a radiation image detector by contact of an object in the case of no lattice. In FIG. 6, the curvature is exaggerated, and the same phenomenon is caused also by changes of temperature and humidity and a change of atmospheric pressure inside and outside the radiation image detector 2, which deviates a focus of lens unit 23 and deteriorates image quality. When the X-ray scintillator section is curved, the lens unit supporting member 28 is put under pneumatic pressure and is also curved equally. It is therefore preferable that a lattice is provided on each of both sides including the X-ray scintillator 21 side and the area sensor 24 side of the lens unit supporting member 28.

Figure 8:
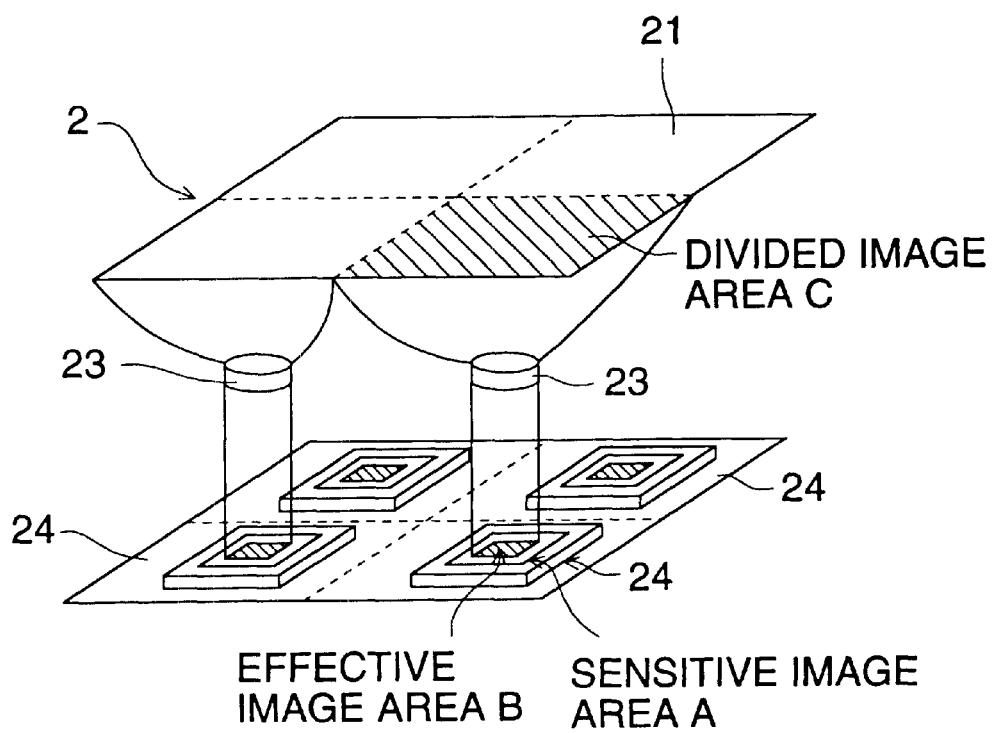
FIG. 8 is a diagram illustrating an effective image area rate of an area sensor.

Next, an effective image area rate in the case of four area sensors will be explained as an example, referring to FIG. 8. When using four area sensors 24, X-ray scintillator 21 is divided into four equally. Each area generated by dividing into four on X-ray scintillator 21 is called "divided image area". Each divided image area C forms an image on corresponding area sensor 24 through lens unit 23. An area where one divided image area C is formed on corresponding area sensor 24 is called "effective image area". An area having sensitivity on the area sensor is called "sensitive image area".

On the other hand, in the invention, effective image area B is radiographed to be smaller than sensitive image area A so that a margin is given to the periphery (unused pixels are provided on the periphery). The rate of effective image area B to sensitive image area A (effective image area B/sensitive image area A) is called "effective image area rate". Image data of the total area prepared from four divided image areas C (namely, all X-ray scintillators) is called "all images data".

Figure 9:
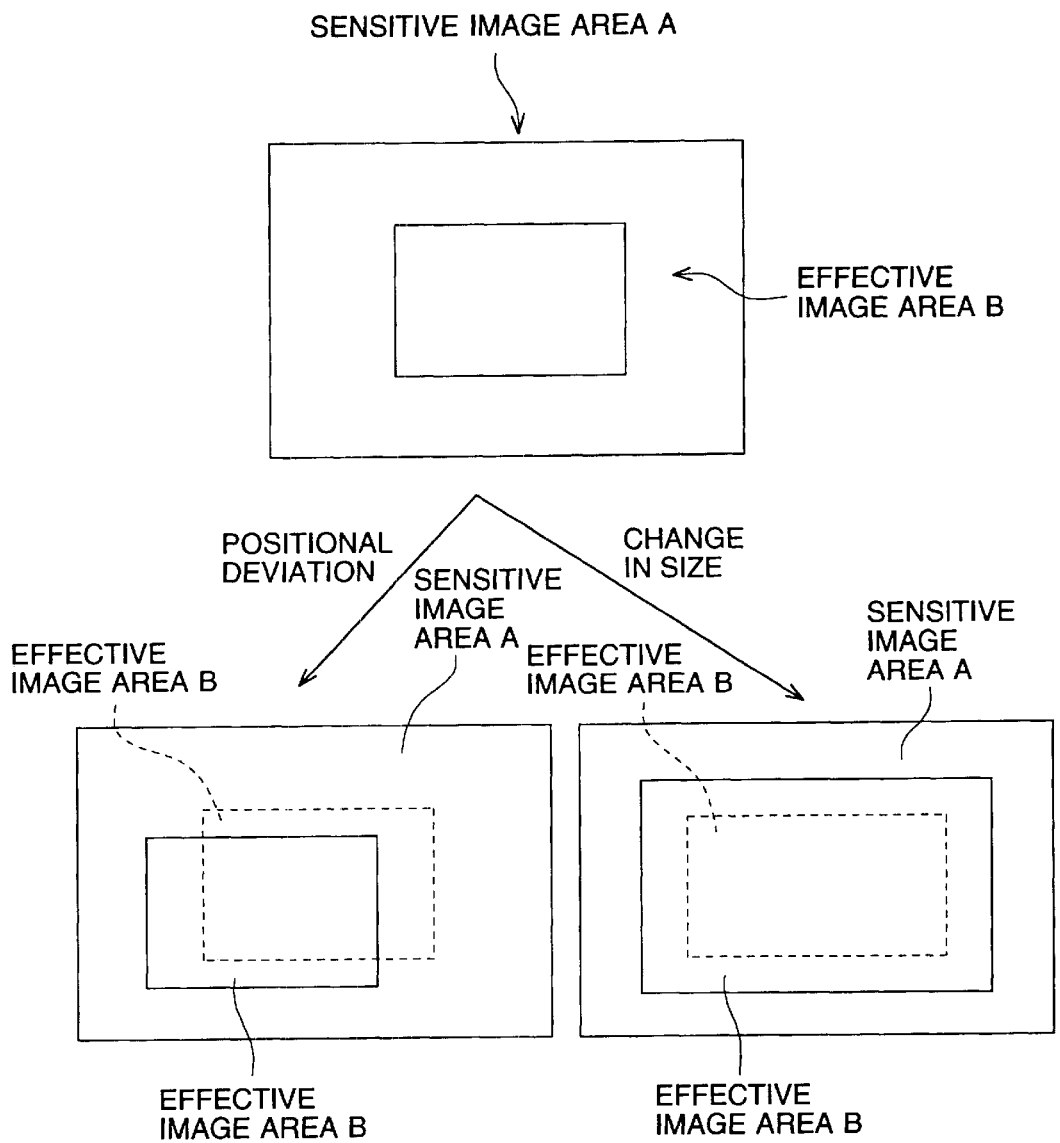
FIG. 9 is a diagram illustrating a positional deviation and a change in size of an image formed on an area sensor.

Due to constitution of the radiation image detector 2 of the invention, positional change of an effective image area and/or change in size in a considerable amount for effective image area B formed on area sensor 24 is sometimes caused by ambient circumstances, mainly by temperature. Therefore, a margin is given to the periphery of effective image area B so that effective image area B (area on area sensor 24) which is radiographed on area sensor 24 through lens 23 from divided image area C (area on X-ray scintillator 21) of X-ray scintillator 21 covered by one area sensor 24 may be covered by sensitive image area A, even when positional deviation and change in size are caused as shown in FIG. 9. So, an effective image area rate (effective image area/felt image area) of sensitive image area A of area sensor 24 is made to be 99% or less. When the effective image area rate is too low, area sensor 24 can not be used effectively and resolution is lowered (the number of pixels in an area sensor corresponding to the divided image area is lowered). Therefore, the effective image area rate is made to be 5% or more. As a result, images of high resolution can be obtained, even when positional change of an effective image area and/or change in size for an effective image area formed on an area sensor is caused by ambient circumstances, mainly by temperature. It is further preferable that the effective image area rate is within a range from 50% to 90%.

Initial setting of effective image area B is carried out after an apparatus is manufactured, or after an facility is installed. A setting method includes the following.

(1) A position estimated from the design is made to be an effective image area.

(2) A lattice-shaped object, for example, is photographed, and then, an effective image area is determined from the position on an area sensor where the aforesaid object is formed.

As a lattice-shaped object used in this case, those having the structures shown in FIG. 10(a) and FIG. 10(b), for example, are considered. Hatched sections are made of substances having high X-ray absorption rate, and white sections are made of substances having low X-ray absorption rate. White portions may be air where nothing is contained, but in the case of FIG. 10(a), a support having low X-ray absorption rate is needed. Those having high X-ray absorption rate include metal such as lead or tungsten, for example, and those having low X-ray absorption rate include, for example, plastics and aluminum.

Figure 11:
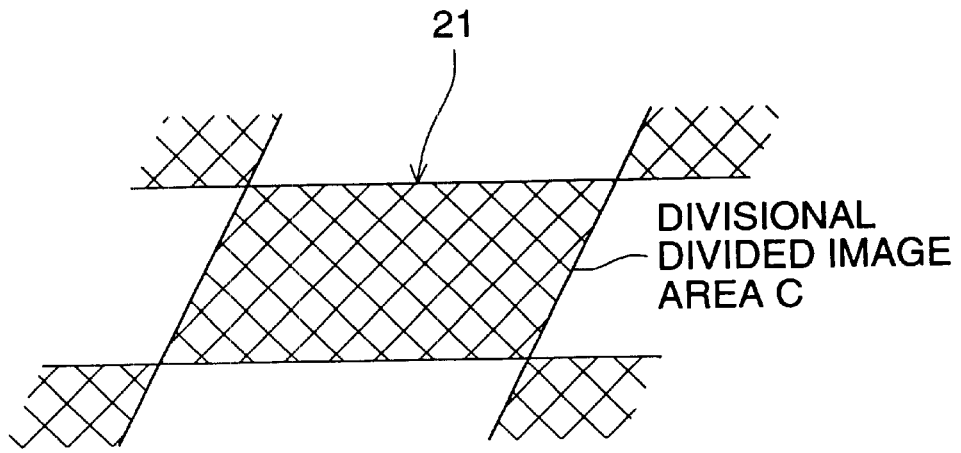
FIGS. 11(a) and 11(b) are diagrams showing how an effective image area is established by a lattice.
Figure 11:
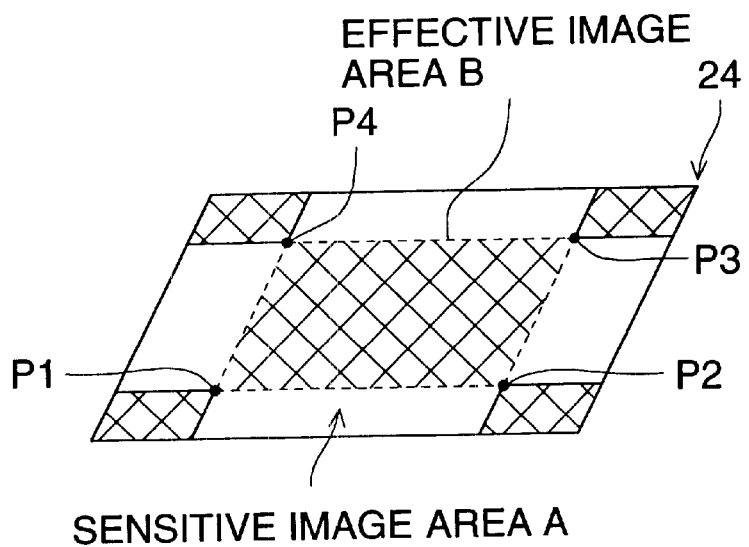
Figure 12:
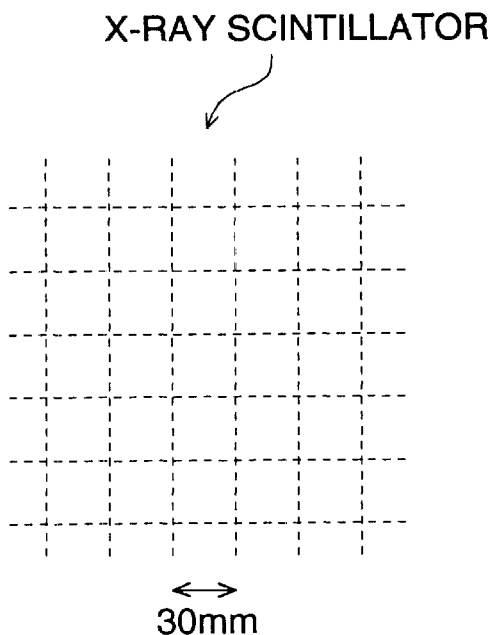
FIGS. 12(a) and 12(b) are diagrams showing the structure of a lattice.
Figure 12:
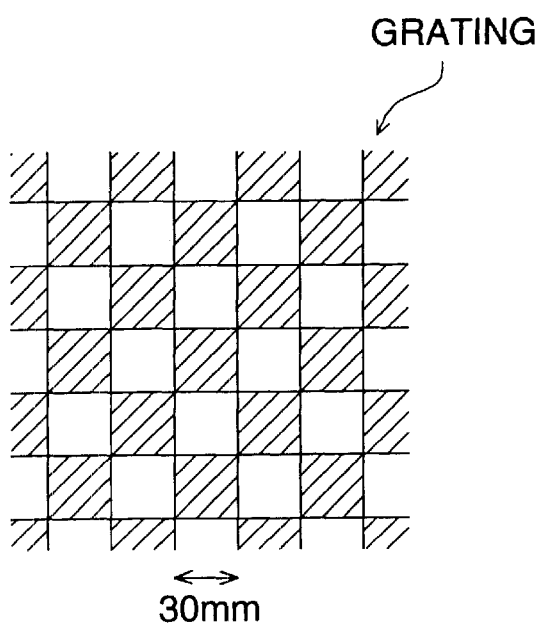

With regard to a lattice used for setting the initial position of an effective image area and/or correcting change in size, it is preferable that a pitch is the same as a length of divided image area C of one division as shown in FIG. 11. For example, when a length of one side of divided image area C on X-ray scintillator is 30 mm as shown in FIG. 12, it is preferable that a pitch of the lattice is 30 mm.

When a lattice shown in FIG. 10(a) is superposed on divided image area C on X-ray scintillator 21 so that mutual positions may agree each other as shown in FIG. 11(a), an area within dotted lines where the lattice is photographed with four corner points P1–P4 serving as references as shown in FIG. 11(b) is made to be effective image area B.

Jigs including a lattice for preparing correction data need to be arranged so that they are constantly fixed at the same positions to prepare the correction data. In this case, the lattice is installed basically on the surface side (the side closer to X-ray source) of X-ray scintillator 21.

This radiation image pickup apparatus has therein a correction data storage means which stores therein initial setting, and thereby, positional change of an effective image area and/or change in size for an effective image area against its initial position are corrected, and an optical distortion is corrected. A method for correction of positional change of an effective image area and/or change in size for an effective image area includes a method to correct an amount of change of an effective image area between the initial position of the effective image area and correction data and a method to renew the initial position of the effective image area based on the results of the correction of the positional change of an effective image area and/or change in size for the effective image area.

Figure 13:
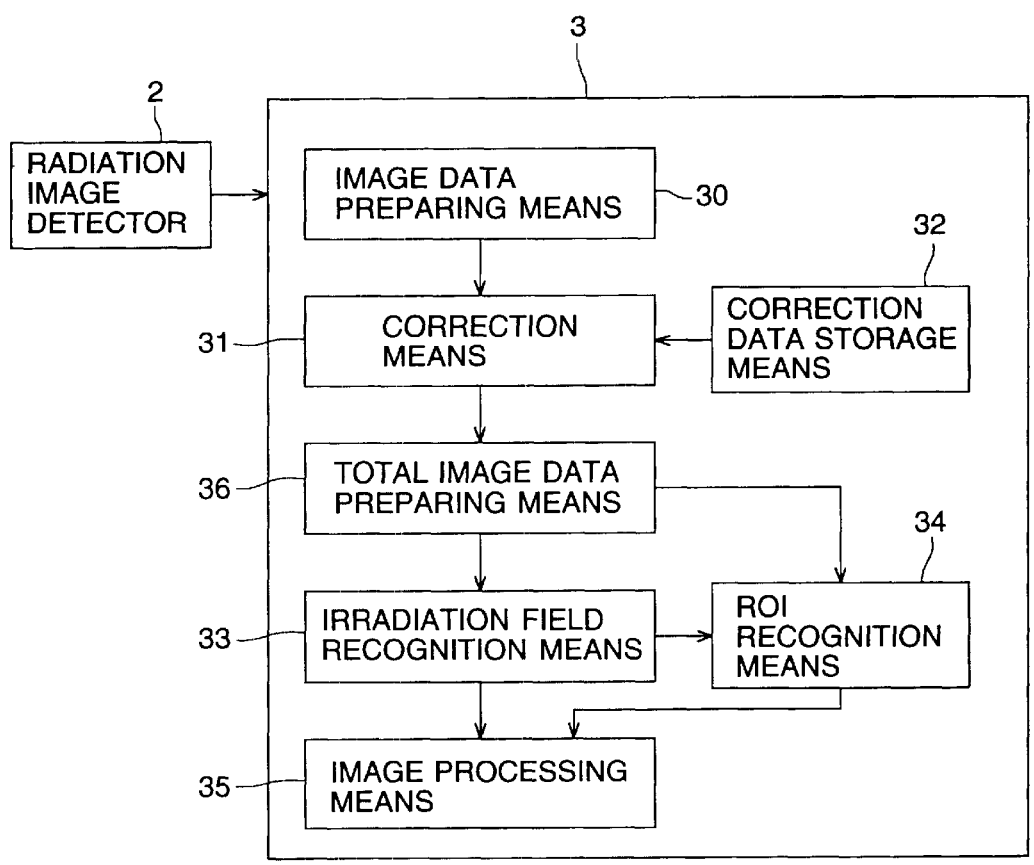
FIG. 13 is a block diagram showing constitution of an image processing section in a radiation image pickup apparatus.

FIG. 13 shows constitution of image processing section 3 of a radiation image pickup apparatus of the invention. The radiation image pickup apparatus of the present embodiment is equipped with radiation image detector 2, and image processing section 3 has therein image data preparation means 30 and prepares image data of each division from image signals of each area sensor.

Further, the image processing section 3 in the invention has therein correction means 31 to correct positional deviation and/or change in size for an effective image area, and corrects positional change of an effective image area and/or change in size for effective image area B of each area sensor 24. Positional change of an effective image area and/or change in size for an effective image area formed on area sensor 24 is caused fairly frequently by ambient circumstances. For example, a movement of the position of a pixel in area sensor 24 corresponding to a certain point of X-ray scintillator 21 from its initial position is caused fairly frequently by ambient circumstances. Therefore, positional change of an effective image area and/or change in size for an effective image area from the initial position for photographing is corrected. As a result, even when positional change of an effective image area and/or change in size for an effective image area formed on area sensor 24 is caused by ambient circumstances, mainly by temperature, images of high resolution can be obtained.

Further, image processing section 3 of the invention has therein correction data storage means 32 which stores data for correcting positional change of an effective image area and/or change in size for an effective image area prepared in advance, and correction means 31 uses correction data for positional change of an effective image area and/or change in size for an effective image area to correct positional change of an effective image area and/or change in size for effective image area B of each area sensor 24. For the purpose of correcting positional change of an effective image area and/or change in size for an effective image area, correction data for the positional change of an effective image area and/or change in size for an effective image area are prepared in advance, and the positional change of an effective image area and/or change in size is corrected by the use of the correction data for image data obtained by photographing. As a result, even when positional change of an effective image area and/or change in size for an effective image area formed on an area sensor is caused by ambient circumstances, mainly by temperature, images of high resolution can be obtained.

It is preferable that correction data for positional deviation change of an effective image area and/or change in size for an effective image area are data obtained by photographing a lattice-shaped object. For preparation of correction data, it is possible to prepare the correction data through a method wherein a lattice-shaped object is photographed, and image data obtained from the photographing are made to correspond to the image of the object photographed originally.

Figure 14:
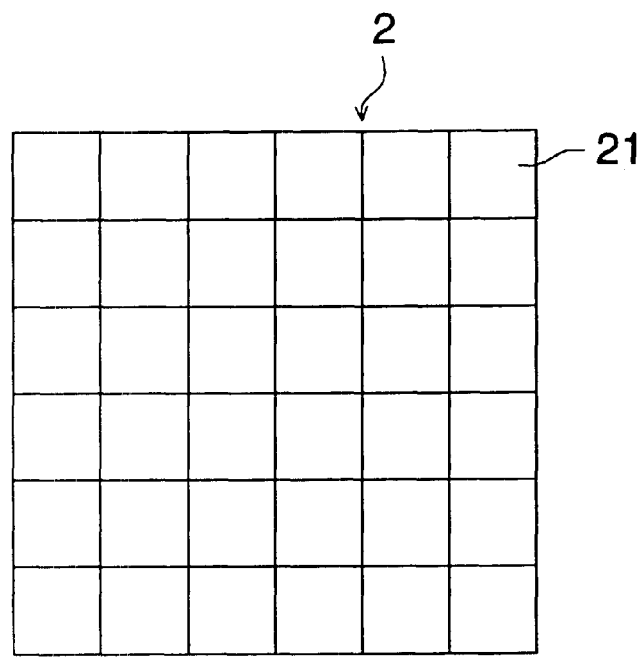
FIG. 14 is a diagram illustrating a positional change and a change in size both for an image formed on an area sensor.
Figure 14:
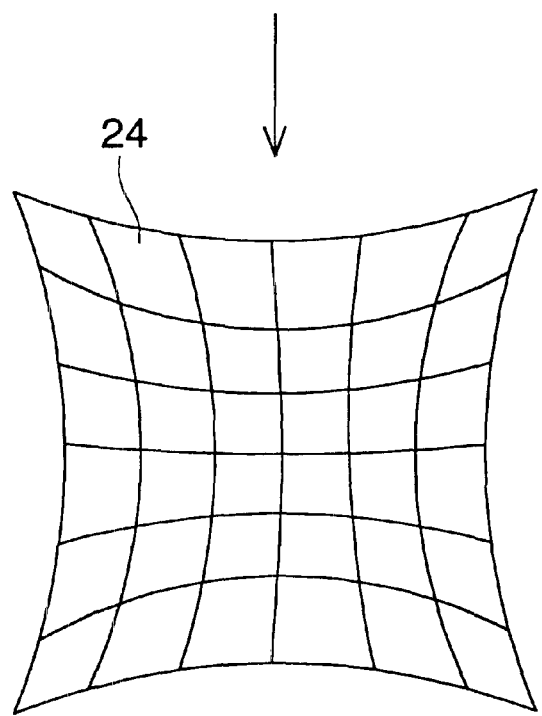
Figure 15:
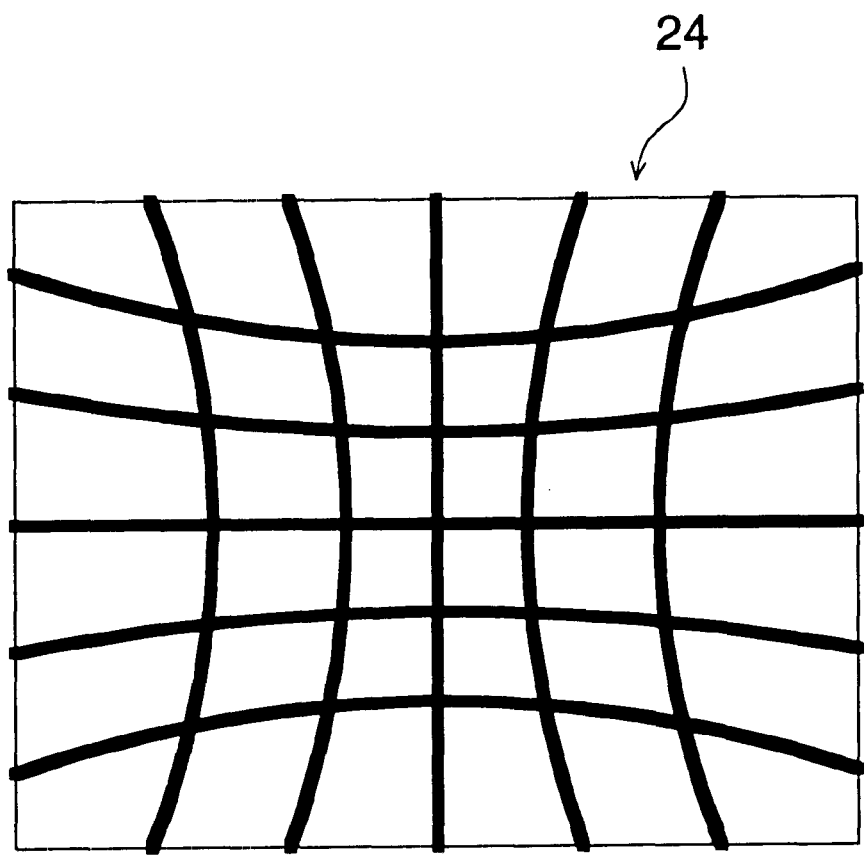
FIG. 15 is a diagram illustrating distorted lattices formed on an area sensor.
Figure 16:
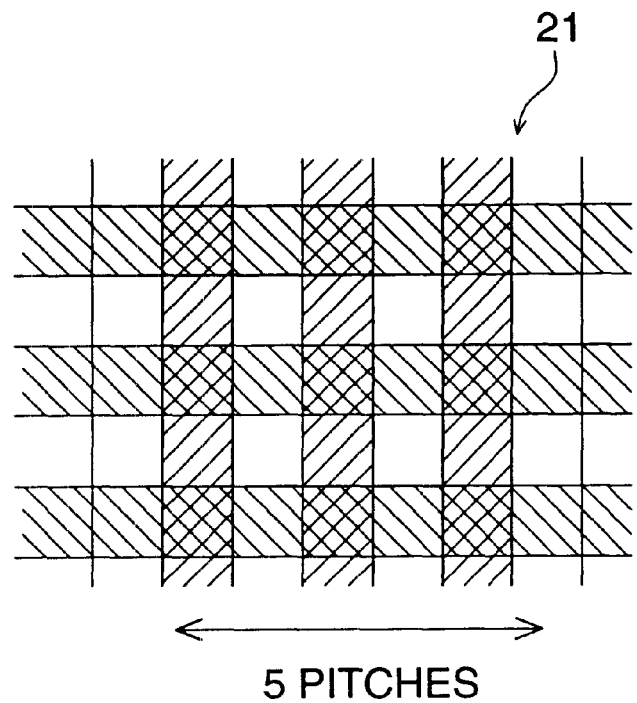
FIGS. 16(a) and 16(b) are diagrams showing that an original image is a lattice.
Figure 16:
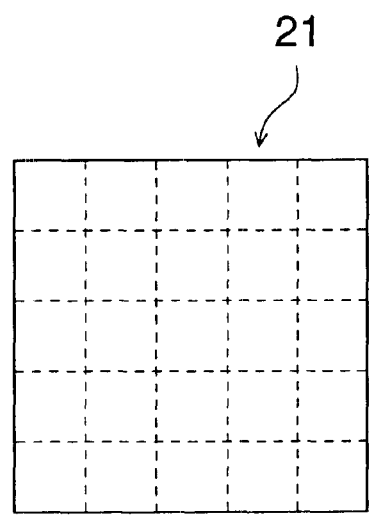

Next, image processing section 3 of the radiation image pickup apparatus (a radiation image acquiring apparatus) of the invention has optical distortion correction means 31, and corrects optical distortion caused by lens unit 23. In radiation image pickup apparatus 2, optical distortion is caused fairly frequently by lens unit 23 (FIG. 14) because lens unit 23 is used. Therefore, the distortion is corrected (distorted image is transformed into the shape of the photographed lattice) for image data obtained by each area sensor 24 (for example, FIG. 15). As a result, even when a distortion is caused on an image formed on an area sensor, images of high resolution can be obtained.

Figure 10:
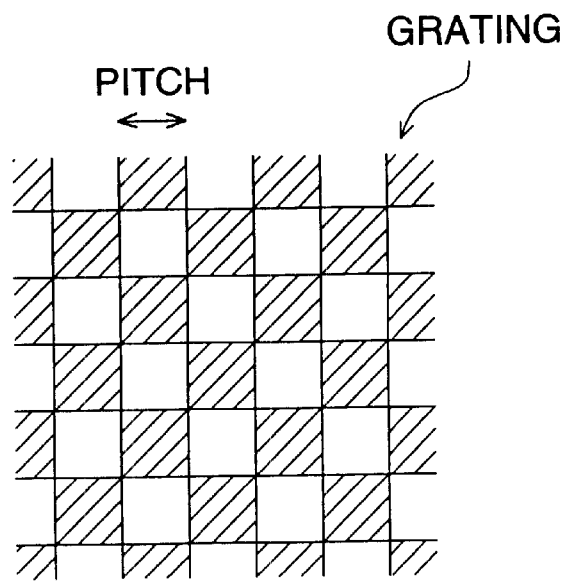
Figure 10:
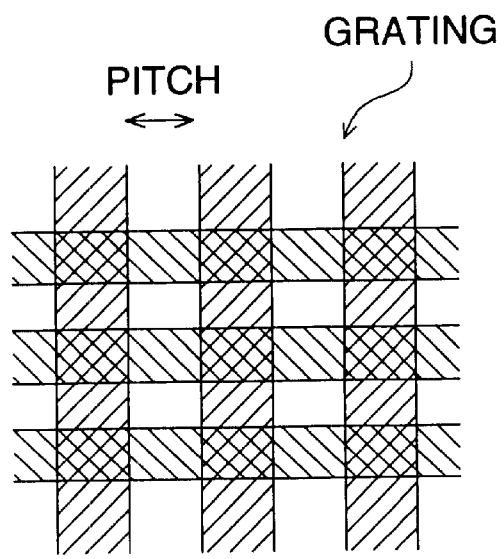

Further, correction data storage means 32 stores distortion correction data prepared in advance, and uses the distortion correction data to correct optical distortion caused by a lens. For correcting the optical distortion, it is preferable to prepare correction data in advance, and to correct the optical distortion by using the correction data for image data obtained through photographing. It is preferable that the distortion correction data are data obtained by photographing a lattice-shaped object as shown in FIG. 10. For preparation of correction data, it is preferable to prepare the correction data through a method wherein a lattice-shaped object is photographed, and image data obtained from the photographing are made to correspond to the image of the object photographed originally.

On X-ray scintillator 21, 5×5 pitch of a lattice, for example, represents a division of divided image area C1, and it is preferable that a pitch of a lattice used for correction of a distortion is smaller than that of a lattice used for correction of positional deviation and/or change in size for an effective image area. The reason for the foregoing is that a shape of the distortion needs to be recognized within one divided image area (within area sensor 24). It is therefore preferable that a pitch of a lattice is not more than ⅕ of a length of one side of a divided image area. For example, when a length of one side of a divided image area is 30 mm, it is preferable that a pitch of a lattice is not more than 6 mm. For correction of a distortion, use of a lattice shown in FIG. 10(*b*) makes it easier to prepare correction data.

As shown in FIG. 13, image data of each area sensor are superposed by total image data preparation means 36 after correction of positional deviation and distortion, and thus an image data is prepared.

Now, superposition of each image data will be explained as follows, referring to FIG. 17. Since area sensor 1 corresponds to divided image area C1, point 01 within the divided image area C1 is photographed within effective image area B1, but it is photographed outside effective image area B2 for adjoining area sensor 2 (outside a felt image area, depending on the position of 01).

Figure 17:
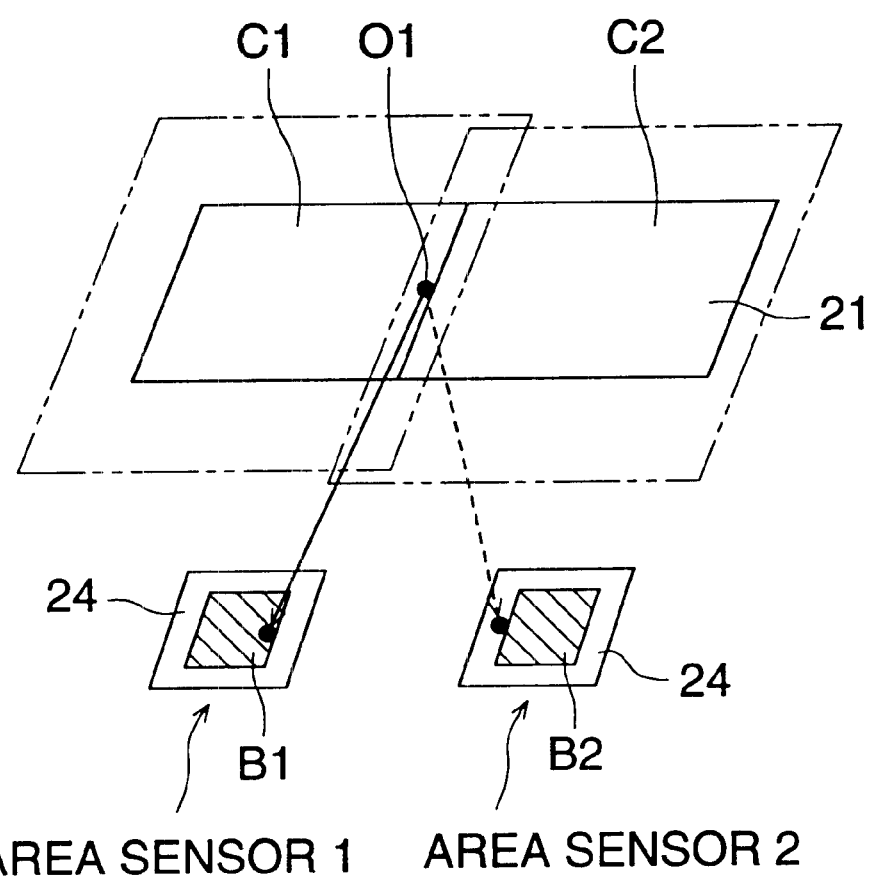
FIG. 17 is a diagram illustrating that a range of images formed on an area sensor is broader than the corresponding divided image area.

For preparation of the total image data, when using an effective image area only as image data of each area sensor, it is possible to obtain the total image data only by superposing simply, because information of each divided image area corresponds to image data of an effective image area of the corresponding area sensor as shown in FIG. 17.

On the other hand, when preparing total image data from an area which is broader than the effective image area, information of one point on a divided image area is photographed in two (or more) area sensors as shown in FIG. 17, and thereby, it is possible to obtain the total image data by making a mean value, for example, of signals of the photographed point to be the signal value of that point. In this case, it is possible to obtain the total image data by using image data of all felt image areas or by using image data for the area where several outer lines are excluded from all felt image areas.

In the case of preparation of the total image data from image signals of effective image area B of each area sensor 24 of radiation image detector 2, when preparing the total image data only from signals of effective image area B among image signals obtained from each area sensor 24, it is possible to obtain image data rapidly.

When preparing total image data from image signals on the area which is broader than effective image area B of each area sensor 24, the total image data are prepared by using signals of the area which includes effective image area B and is larger than the effective image area B, concerning signals obtained with each pixel of each area sensor 24. Therefore, it is possible to obtain image data having less noise by averaging the data.

In the case of a digital image, when the number of pixels is increased, image data grow greater and more memories are needed and more time is required for transmission of images. Further, since the radiation image pickup apparatus of the invention can read in great detail, the number of pixels tends to be increased. Therefore, it is desirable to make an amount of total image data small by eliminating or compressing image data of pixels which are not necessary for diagnoses, and thereby, a large quantity of data can be processed rapidly.

As a location which is not necessary for diagnoses, there are given the outside of an irradiation field where no X-ray is irradiated and the outside of ROI which is composed of the photographed object and its surroundings, and it is desirable to make an amount of total image data by eliminating or compressing image data of those pixels.

Image processing section 3 of the invention has therein irradiation field recognition means 33, ROI recognition means 34 and image processing means 35.

Figure 18:
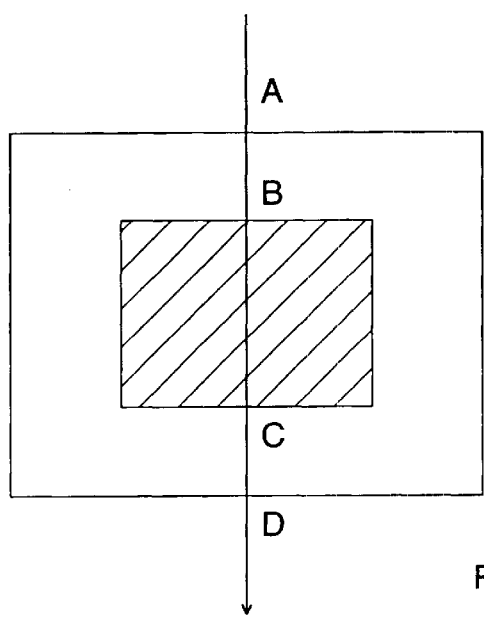
FIGS. 18(a) and 18(b) are diagrams illustrating irradiation field recognition.
Figure 18:
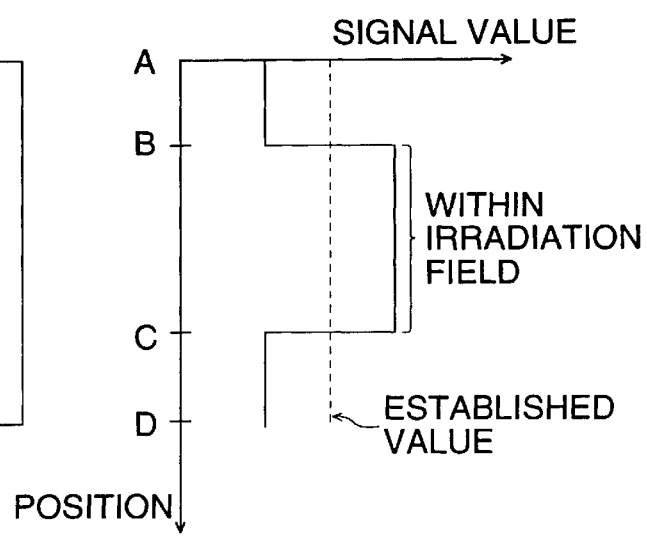

The irradiation field recognition means 33 conducts irradiation field recognition from image data obtained by radiation image detector 2. In the method of irradiation field recognition, a signal value of each pixel of total image data is compared with an established value (threshold value) as shown in FIG. 18, and a pixel having the value higher than the established value is regarded to be within the irradiation field. However, even in the irradiation field, there is a pixel whose value is smaller than the established value, depending on the radiographing region, wherein that position is regarded to be within the irradiation field.

In the method of judging the irradiation field, a square or round boundary line is formed on a border between the inside and the outside of the outermost irradiation field, and the inside of the boundary line is regarded to be in the irradiation field. In addition to this, there are a method as in TOKKAISHO No. 63-259538 wherein a differential signal value of each pixel is obtained, and an irradiation field edge section is obtained from the pixel whose value is larger than the established value, and a method as in TOKKAISHO No. 63-244029 and TOKKAIHEI No. 2-96883 wherein contour-prospective points (boundary lines of the irradiation field) arranged on a straight line are detected.

The ROI recognition means 34 conducts ROI (region of interest) recognition from the obtained image data. Concept of the ROI recognition means is basically the same as that of the aforesaid irradiation field recognition method. However, since the area outside ROI in the irradiation field is irradiated by a large quantity of X-rays and its signal value is high, the area whose value is lower than a certain established value is regarded to be in ROI. In the case of ROI which is different from the case of the irradiation field, after obtaining a boundary line, some margins are given to the boundary line and a range surrounded by the boundary line is established to be ROI. The reason for this is that it is better not to cut on an inelastic basis, because a boundary section (which is supposed to be skin in many cases) is sometimes observed in the course of diagnoses. As a size of the margin, a range of 5–100 mm from the boundary section of the object is preferable.

In the image processing means 35, there are conducted various kinds of image processing which include gradation processing for indicating, constantly and stably, images in density and contrast appropriate to diagnoses independently of a patient figure and irradiation dose, for example, frequency processing for controlling sharpness of images, dynamic range compression processing for making total images to be covered by a range of density for easy observation without lowering the contrast with microscopic structure, elimination processing and processing for enlargement, reduction, movement and rotation.

Figure 19:
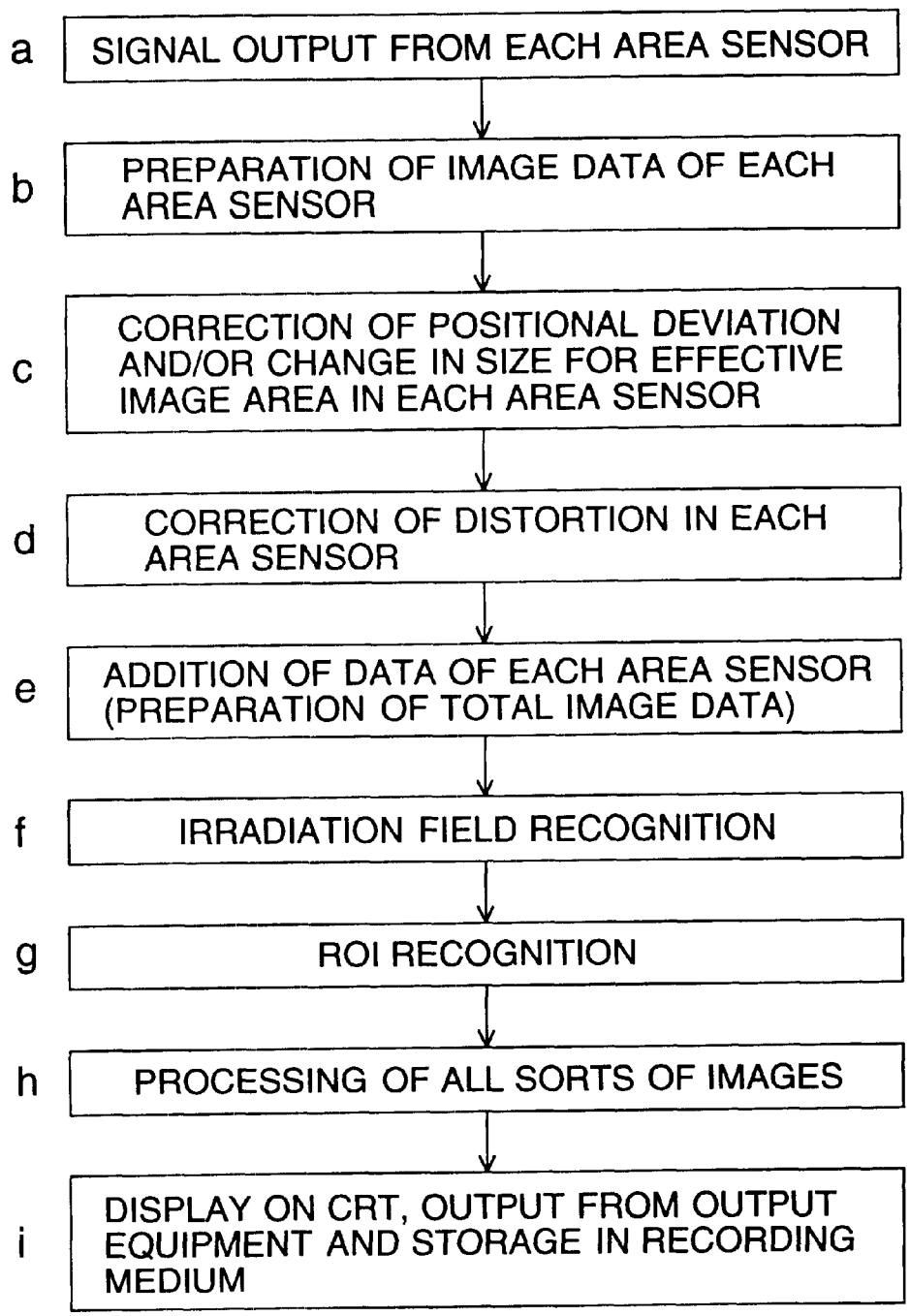
FIG. 19 represents an image processing flow of a radiation image pickup apparatus.

Next, image processing conducted by the radiation image pickup apparatus will be explained based on FIG. 19. The radiation image pickup apparatus of the invention is equipped with radiation image detector 2 which is composed of an X-ray scintillator, a lens array, and an area sensor corresponding to each lens unit of the lens array all arranged in this order, and in step a, a signal output is outputted from each area sensor of the radiation image detector 2, and this output signal is accepted by image processing section 3. In the image processing section 3, image data in each division are generated from the signal output from each area sensor (step b). Then, positional change of an effective image area and/or change in size for an effective image area of each area sensor is corrected by the use of correction data prepared in advance for positional change of an effective image area and/or change in size for an effective image area (step c).

Next, in step d, optical distortion caused by lens unit 23 is corrected by the use of distortion correction data prepared in advance, and then, image data of each area sensor 24 are superposed to form an image data (step e).

Further, irradiation field recognition processing is conducted in step f, and then, ROI recognition processing is conducted in step g. After conducting these irradiation field recognition and ROI recognition, various kinds of image processing are conducted in step h. These various kinds of image processing include gradation processing stated above, frequency processing, dynamic range compression processing, or elimination and/or reason of compression for image data outside the irradiation field or ROI obtained in the foregoing, and after these image processing, display is made on CRT, or output is made from an outputting equipment, or storage is made on a recording medium (step i).

Owing to the radiation image detector 2 employed, the radiation image pickup apparatus can provide high spatial resolution and high image quality, and can be made to be thin in thickness and light in weight. Further, it can offer images of high resolution and can process a large quantity of data rapidly, even when positional deviation, change in size and distortion for images of an effective image area formed on an area sensor are caused by ambient circumstances, mainly by temperature.

Example

Figure 20:
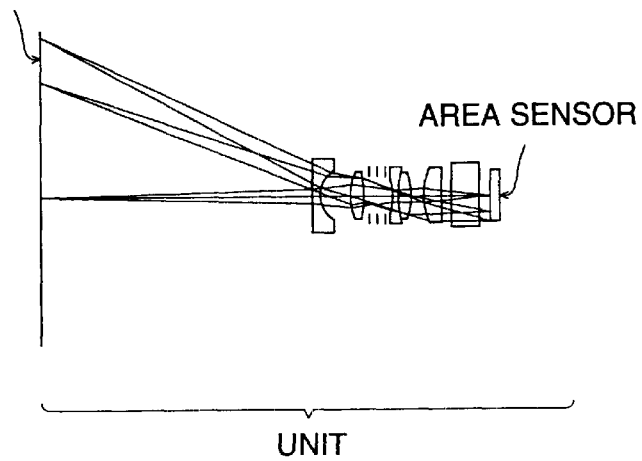
FIG. 20 is a sectional view of one unit of a radiation image detector.

FIG. 20 is a sectional view of one unit of a radiation image detector. One unit of the radiation image detector reduces an area of 30×30 mm on the X-ray scintillator to an area of 5×5 mm on CCD for image forming. Focal length f of the lens unit is 5.9 mm, effective F number is 2.8, magnification M is 1/6, and half field angle ω is 27.3°. The lens unit is composed of 4 lenses including a doublet, correcting not only monochromatic aberration but also of chromatic aberration taking account of spectral divergence of luminescence of the X-ray scintillator. A flat board on the image side of the lens unit is a lowpass filter which is for preventing a moire fringe. When the luminescence is diverged to the infrared, an infrared-cut filter is sometimes added.

Three light fluxes in FIG. 20 correspond respectively to a diagonal distance (object height 21.2 mm), a lateral distance (15 mm) and the center in the area on the X-ray scintillator.

Figure 21:
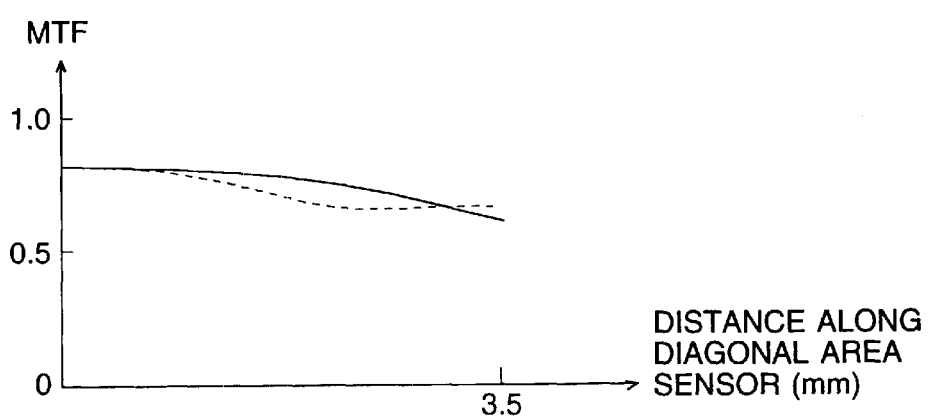
FIG. 21 is a diagram showing MTF for an image height.

CCD employs one wherein a pixel size is 10×10 $\mu$m, and the number of pixels in the effective area is 250,000. The spatial frequency corresponding to the pixel pitch is 50 lines/mm, and MTF for an image height corresponding to the aforesaid spatial frequency is shown in FIG. 21 and thereafter.

A solid line shows a sagittal direction and a dotted line shows a meridional direction. MTF is usually high at the central portion, and it is lowered by an influence of aberration at the periphery. In this case, a design has been made so that an amount of fall on the periphery may be within a range of 30% of MTF at the center (when MTF at the center is 0.80, MTF on the periphery needs to be 0.56 or more).

Figure 22:
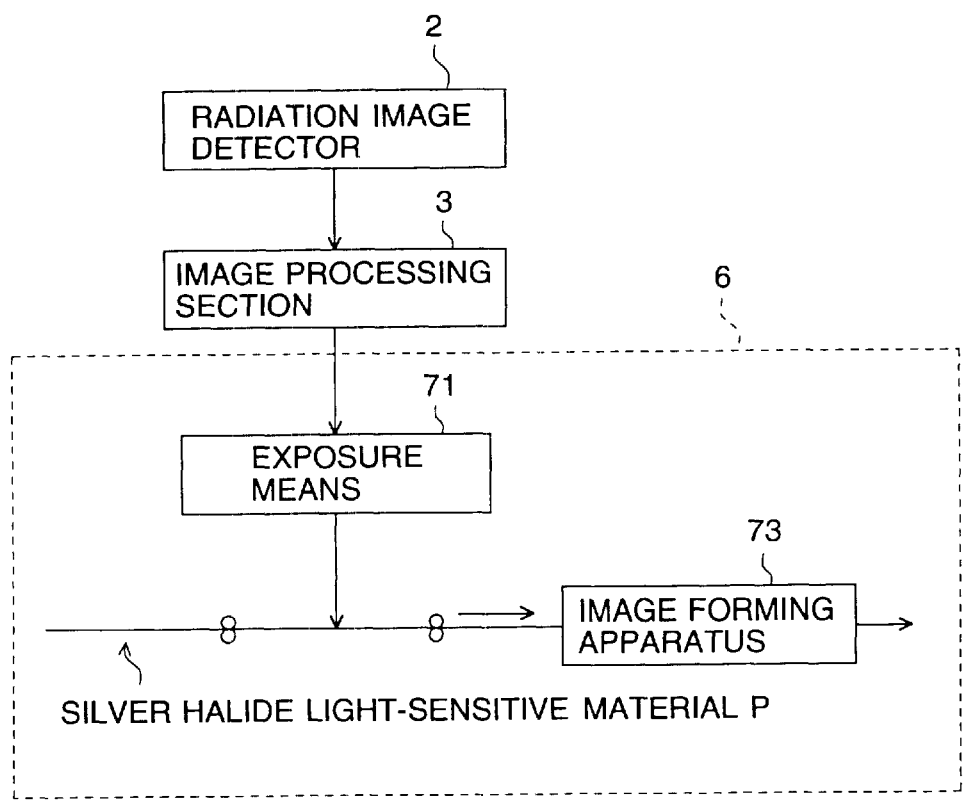
FIG. 22 is a schematic diagram of a radiation image forming system.

FIG. 22 shows a schematic diagram of a radiation image forming system wherein detection is made by radiation image detector 2, X-ray images are taken out of the radiation image detector 2 as image signals, the image signals are transformed into laser beam intensity fluctuation, silver halide photographic light-sensitive material P having at least one light-sensitive silver halide emulsion layer is subjected to scanning exposure by exposure means 71, then, image forming apparatus 73 develops by using alkaline processing composition containing therein silver halide solvent to make at least a part of unexposed silver halide in the light-sensitive silver halide emulsion layer to be diffusible silver complex, to form an image on a silver depositing nucleus-containing image receiving layer by transferring at least a part of the diffusible silver complex onto the silver depositing nucleus-containing image receiving layer and to separate the silver depositing nucleus-containing image receiving layer from a light-sensitive element after the image forming, and thereby to obtain an X-ray image, thus, X-ray images having high sharpness, high resolution and high image quality which are required, for example, for mammography and appendicular skeleton can be obtained rapidly and surely.

Hereinafter, a silver halide photosensitive photographic material comprising a photosensitive silver halide emulsion layer and the processing of the same will be detailed below.

A silver salt diffusion transfer method is well known in this industry, in which an exposed silver halide photosensitive photographic material is developed employing an alkaline processing composition comprising a silver halide solvent; at least one portion of unexposed silver halide is converted into a transferable silver complex; at least one portion of the resulting transferable silver salt is transferred to a silver precipitating nuclei containing image receiving layer to form an image; and after image formation, said silver precipitating nuclei containing image receiving layer is peeled from a photosensitive element to obtain a photographic image. Its details can be found in the following publications; A. Rott and E. Weyde, "Photographic Silver Halide Diffusion Processes", Focal Press, 1972, J. Sturge, V. WalWorth, and A Shepp, "Imaging Processes and Materials: Neblete's Eighth Edition", Van Nostrand Reinhold, 1989), G. Haiast, "Modern Photographic Processing Vol. 2", John Wiley and Sons, 1979, and the like.

As one example of said silver salt diffusion transfer, the so-called peel apart system, as described below, can be cited. A photosensitive element, prepared by applying a silver halide emulsion onto a support, is in contact with an image receiving element, and an alkaline processing composition such as, for example, a high or low viscous alkaline processing composition comprising developing agents and silver halide solvents, is spread between the aforementioned elements, and after an image transfer developing process, said image receiving element is peeled apart from the processing composition to obtain a silver image on said image receiving layer. Further, a mono-sheet system is also known in which a transferred image is seen without peeling off the image receiving element. In addition, after only the photosensitive element is in contact with a processing composition, first the photosensitive element is in contact with an image receiving element, and those are subjected to image transfer development process, and both are then peeled apart to obtain the transferred image on the image receiving element. In such silver salt diffusing transfer methods, one of the important features is that images are immediately obtained at the place where the images are photographed.

The photosensitive element, the image receiving element, and the processing composition employed in the present invention will now be described. In the present invention, a photosensitive element is preferably employed which comprises a both surface-subbed support, comprised of polyethylene terephthalate film containing titanium dioxide or carbon black, having on one surface a photosensitive silver emulsion layer thereon a protective layer and on the other surface a carbon black layer thereon a protective layer. Dyes may be employed instead of said carbon black or may be employed together with said carbon black. Further, when carbon black and/or dyes are incorporated into the polyethylene terephthalate, a carbon black containing layer and/or a dye containing layer may not be provided on another surface of the support. Still further, said titanium oxide may be replaced with white pigments.

Other than the aforementioned polyethylene terephthalate, employed as supports are polyethylene naphthalate, syndioctatic polystyrene, paper laminated with polyethylene, baryta paper, cellulose triacetate, and the like. The aforementioned photosensitive silver halide emulsion layer, protective layer, a carbon black layer, and the like generally comprise hydrophilic binders such as gelatin and the like.

A thickness of emulsion layer of the light-sensitive material relating to the invention is preferably within the range of from 0.5 to 2.5 $\mu$m, more preferably 0.8 to 2.0 $\mu$m. The thickness of the emulsion layer is defined as the thickness of the emulsion layer provided on one side of the support when emulsion layers are provided on both sides of the support, and the thickness is the total thickness of the emulsion layers when plural emulsion layers are provided on one side of the support. The thickness of the layer can be measured by an electron microscopic photograph of the sample after standing for at least 2 hours in an atmosphere of 23° C. and 50% RH.

A silver halide emulsion to be used in the light-sensitive material can be prepared by a known method. The crystal habit of the grain may be cubic, tetradecahedral, octahedral and that such as spherical in which (111) face and (100) face are optionally coexisted. In the crystal structure of the silver halide grain, the silver halide composition may be different at the inner and outer portion of the grain. For example, a monodisperse emulsion having a higher iodide content at the inner portion described in Japanese Patent Publication Open for Public Inspection (JP O.P.I.) No. 2-85846.

In the invention, tabular silver halide grains having an average aspect ratio of not less than 2 are preferably usable, the average aspect ratio is more preferably not less than 3 and nor more than 20. The aspect ratio is defined as the ratio of the diameter of the major plane of the tabular grain (grain diameter) to the thickness of the grain. The diameter of main plane of silver halide grain is the diameter of a circle having the same area as the projection area of the major plane.

In the invention, the diameter of the major plane of the tabular silver halide grain is preferably within from 0.05 to 2.0 $\mu$m, more preferably from 0.1 to 1.5 $\mu$m, particularly preferably from 0.15 to 1.0 $\mu$m. The tabular silver halide grain generally a tabular-shaped grain having two parallel major planes. Accordingly, the thickness is the distance of the parallel major planes constituting the tabular silver halide grain. The advantage of the tabular grain is that the spectral sensitization efficiency can be raised and the graininess and the sharpness of image can be improved. Such the effects of the tabular grain are disclosed in, for example, British Patent No. 2,112,157, U.S. Pat. Nos. 4,439,520, 4,433,048, 4,414,310 and 4,434,226, and JP O.P.I. Nos. 58-113927, 58-127921, 63-138342, 63-284272 and 63-305343. The emulsion can be prepared according to the methods described in these publications. Moreover, a tabular grain having (100) major plane described in U.S. Pat. Nos. 4,063,951, 4,386,156, 5,275,930 and 5,314,798 is also preferably usable.

The silver halide emulsion more preferably usable in the invention is silver iodobromide having a silver iodide content of less than 3 mole-%, silver iodochlorobromide, silver bromide, silver chlorobromide, and silver chloride, and silver bromide, silver iodobromide and silver chlorobromide each having a silver iodide content of less than 1.0 mole-% are particularly preferable. The foregoing emulsion may be either a surface latent image forming type which forms a latent image on the surface of the grain or an internal image forming type which forms a latent image in the inner portion of the grain.

The silver halide emulsion relating to the invention is preferably a monodisperse emulsion. An emulsion having a variation coefficient of volume average diameter of not more than 20% is preferably used and one having the variation coefficient of not more than 10% is more preferably used. In the invention, in the case of the tabular grain, the volume average diameter is the average of length of a side of a cube having the same volume as the tabular grain. In the case of a grain having another shape, the conversion is performed in the same manner. The above-mentioned cubic grain and the tetradecahedral grain may be used in a mixture with the tabular grain.

It is preferable that the silver halide emulsion to be used in the invention contains a complex of a metal selected from Fe, Co, Ru, Rh, Re, Os and Ir. The metal complex may be used singly or in combination of two or more kinds of them. The content is preferably from $1\times10^{-9}$ to $1\times10^{-2}$ moles, more preferably from $1\times10^{-8}$ to $1\times10^{-4}$ moles, per mole of silver. In the invention, a hexa-coordination complex represented by the following formula is preferred.

Formula $[ML_6]^m$

In the formula, M is a transition metal selected from the elements of Groups 6 to 10 of the periodic table, L is a bridging ligand, m is 0, −1, −2, −3 or −4. Examples of ligand represented by L include a halide (fluoride, chloride, bromide and iodide), a cyanide, a cyanate, a thiocyanate, a selenocyanate, a tellurocyanate, an azide and aquo ligand, a nitocyl and a thionitrocyl. Among them, aquo, nitrocyl and thionitrocyl are preferable. When the aquo ligand is present, it is preferable that the aquo ligand occupies one or two ligands. L may be the same or different.

Preferable examples when M is rhodium (Rh), ruthenium (Ru), Rhenium (Re), osmium (Os) or iridium (Ir), are shown below.

1: $[RhCl_6]^{3-}$
2: $[RhCl_5(H_2O)]^{2-}$
3: $[Rh(NO)_2Cl_4]^-$
4: $[Rh(NO)(H_2O)Cl_4]^-$
5: $[Rh(NS)Cl_5]^{2-}$
6: $[RuCl_6]^{3-}$
7: $[RuBr_6]^{3-}$
8: $[Ru(NO)Cl_5]^{2-}$
9: $[Ru(NO)(H_2O)Cl_4]^-$
10: $[Ru(NS)Cl_5]^{2-}$
11: $[RuBr_4(H_2O)]^{2-}$
12: $[Ru(NO)CN_5]^{2-}$
13: $[ReCl_6]^{3-}$
14: $[Re(NO)Cl_5]^{2-}$
15: $[Re(NO)CN_5]^{2-}$
16: $[Re(NO)ClCN_4]^{2-}$
17: $[Re(NO)Cl_5]^-$

18: $[Re(NS)Cl_4(SeCN)]^{2-}$
19: $[OsCl_6]^{3-}$
20: $[Os(NO)Cl_5]^{2-}$
21: $[Os(NS)Cl_4(TeCN)]^{2-}$
22: $[Os(NS)Cl(SCN)_4]^{2-}$
23: $[IrCl_5]^{2-}$
24: $[Ir(NO)Cl_5]_{2-}$

As chromium, cobalt or iron compounds, hexacyano metal complexes are preferable usable. Examples of them are shown below.

25: $[Cr(NO)Cl_5]^{2-}$
26: $[CrCl_6]^{4-}$
27: $[Fe(CN)_6]^{4-}$
28: $[Fe(CN)_6]^{3-}$
29: $[Co(CN)_6]^{3-}$

The compound supplying the above-mentioned metal ion or complex ion is preferably added at a period of silver halide grain formation so as to be contained in the silver halide grain. The metal ion or the complex ion may be added at any step of the grain formation, namely the steps of nucleus formation, growing, physical ripening and before and after chemical ripening. It is preferable to add at the step of nucleus formation, growing and physical ripening of the grain, and more preferable to add at the steps of nucleus formation and growing the grain. It is most preferable to add at the step of nucleus formation. The addition may be separately performed in several times, and the metal ion or the complex ion may be uniformly contained in the silver halide grain.

A noodle washing method, a flocculation precipitation method and an ultra-filtration method may be applied to remove a water-soluble salt from the emulsion. Preferable desalting methods include a method using an aromatic hydrocarbon aldehyde resin containing a sulfo group described in Japanese Patent 35-16086 and a method using high molecular flocculation agent G3 or G8 described in JP O.P.I. No. 63-158644.

It is preferred that the light-sensitive silver halide grain in the invention is chemically sensitized. Known sensitizing methods such as a sulfur sensitization, a selenium sensitization, a tellurium sensitization, a noble metal sensitization and a reduction sensitization may be applied. Two or more of the sensitizing methods may be applied in combination. A thiosulfate, a thiourea compound and elemental sulfur may be used for the sulfur sensitization. Compounds preferably usable for the selenium sensitization and the tellurium sensitization are described in JP O.P.I. No. 9-230527. Compounds preferably usable in the noble metal sensitization include chloroauric acid, potassium chloroaurate, potassium aurithiocyanate, gold sulfide, gold selenide and compounds described in U.S. Pat. No. 2,448,060 and British Patent No. 618,061.

Compounds usable in the reduction sensitization include ascorbic acid, thiourea dioxide, stannous chloride, a hydrazine derivative, a borane compound, a silane compound and a polyamine compound. The reduction sensitization can be performed by ripening the emulsion while maintaining the pH value of the emulsion at not less than 7.0 or the value of pAg at not more than 8.3.

In the light-sensitive material of the invention, a cyanine dye, a merocyanine dye, a complex cyanine dye, a polynucleus merocyanine dye, a holopolar cyanine dye, a styryl dye, a hemicyanine dye an oxonol dye and a hemioxonol dye may be used as an optical sensitizing dye. For example, sensitizing dyes described in the following publications are usable; JP O.P.I. Nos. 63-159841, 60-140335, 63-231437, 63-259651, 63-304242 and 63-15245, U.S. Pat. Nos. 4,639,414, 4,740,455, 4,741,966, 4,751,175 and 4,835,096.

Sensitizing dyes effectively usable in the invention are described or cited in, for example, Research Disclosure, Item 7643IV-A, p. 23 (December 1978), and Research Disclosure, Item 1831X, p. 437 (August 1978). A sensitizing dye having a spectral sensitivity suitable for the spectral property of the light source of a laser imager or a scanner may be advantageously selected. For example, compounds described in JP O.P.I. Nos. 9-34078, 9-54409 and 9-80679 are preferably usable.

Suitable cyanine dyes are cyanine dyes having a basic nucleus such as a thiazoline nucleus, an oxazoline nucleus, a pyrroline nucleus, a pyridine nucleus, an oxazole nucleus, a thiazole nucleus, a selenazole nucleus and an imidazole nucleus. Preferable ones of suitable merocyanine dye have an acidic nucleus such as a thiohydantoin nucleus, a rhodanine nucleus, an oxazolinedione nucleus, a thiazolinedione nucleus, a barbituric acid nucleus, a thiazolinone nucleus, malonitrile nucleus and a pyrazolone nucleus additionally with the foregoing basic nuclei.

These dyes may be used singly or in combination, the combination of dyes is often used for the purpose of super sensitization. A dye having no sensitizing ability or a substance which substantially does not absorb visible light, which show a super sensitizing effect may be contained in the emulsion. The suitable combination of sensitizing dye and a dye showing the super sensitizing effect and the substance showing the super sensitizing effect are described in Research Disclosure 176, No. 17643 (December 1978) p. 23, Item IV-J, Japanese Patent Nos. 9-25500 and 43-4933, and JP O.P.I. Nos. 59-19032 and 59-192242.

The optical sensitizing dye may be added in a form of solution in an organic solvent such as methanol. The dye may also be added in a form of dispersion of fine solid particles. The adding amount of the spectral sensitizing dye is preferably from 1 to 900 mg, more preferably from 5 to 400 mg, per mole of silver halide even though the amount is varied depending on the kind of dye and the condition of emulsion. The spectral sensitizing dye is preferably added before the completion of chemical ripening process. The dye may be divided several portion and separately added before the completion of chemical ripening. It is more preferable to add the sensitizing dye between the completion of growing process of the grain and before the completion of chemical ripening process. The addition at the time of starting the chemical ripening is particularly preferred.

In the invention, a chemical ripening stopping agent is preferably used to stop the chemical sensitization (chemical ripening) from the view point of the stability of the emulsion. As the chemical sensitization stopping agent, a halide (for example, potassium bromide and sodium chloride), an organic compound known as an antifogging agent or a stabilizing agent (for example, 4-hydroxy-6-methyl-1-3,3a, 7-tetraazaindene) are usable. These compounds may be singly or in combination.

Various photographic additives may be added to the emulsion to be used in the invention at after or before the physical ripening or the chemical ripening. During any process before or after physical or chemical ripening, various types of photographic additives may be incorporated into the emulsion of the photosensitive material employed in the present invention. For the purpose to minimize the formation of fogging during the production process and storage of a photographic material or photographic processing, and to stabilize the photographic performance, various compounds may be incorporated into a photosensitive silver halide emulsion. Preferably employed as such compounds which are well known antifoggants as well as stabilizers are azoles (for instance, benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiazoles, aminotriazoles, nitrobenztriazoles, and benzotriazoles), mercaptopyrimidines, mercaptotriazines, thioketo compounds, azaindenes (for instance, triazaindenes, tetraazaindenes, and pentaazaindens), benzenesulfonic acids, benzenesulfinic acids, benzenesulfonic acid amides, α-lipoic acid, and the like.

Representative examples include 1-phenyl-2-mercaptotetrazole, 4-hydroxy-6-methyl-1,3, 3a,7-tatraazaindene, 2-mercaptobenzothiazole, 5-carboxy-1, 2-dithiolane, and the like. Further detailed specific examples and methods of their use are described in U.S. Pat. No. 3,982,947, and they may be employed.

Inorganic or organic hardeners may be incorporated into the photosensitive element of the present invention. Listed as such hardeners are, for example, chromium salts (for example, chromium alum, chromium acetate, and the like), aldehydes (formaldehyde, glyoxal, and the like), N-methylol compounds (dimethylolurea), methylol dimethyl hydantoin, and the like), dioxane derivatives (2,3-dihydroxydioxane, and the like), active vinyl compounds (1,3,5-triacroyl-hexahydro-S-triazine, bis(vinylsulfonyl)methyl ether, and the like), mucohalogenic acids (mucochloric acid and the like), and the like. These may be employed individually or in combination.

Coating aids may be employed in the silver halide emulsion layer and other hydrophilic colloidal layers of the photosensitive element of the present invention. Employed as coating aids are compounds described in Research Disclosure Volume 176, 17643, page 26 (1978) and Japanese Patent Publication Open to Public Inspection No.61-20035. Further, for the purpose to increase sensitivity as well as contrast or to promote development, may be incorporated, compounds such as, for example, polyalkylene oxides or derivatives thereof such as ether, ester, amine and the like, thioether compounds, thiomorpholines, quaternary ammonium compounds, urethane derivatives, urea derivatives, imidazole derivatives, 3-pyrazolidones. As examples of such compounds, compounds may be employed which are described in U.S. Pat. Nos. 2,400,532, 2,423,549, 2,716,062, 3,617,280, 3,772,021, 3,808,003, and the like.

The dispersion of water-insoluble or slightly water-soluble high molecular weight polymers may be incorporated into the silver halide emulsion layer in the photosensitive element of the present invention. For example, employed as monomer components may be alkyl acrylate, alkyl methacrylate, alkoxyalkyl acrylate, alkoxyalkyl methacrylate, glycidyl acrylate, glicidyl methacrylate, vinyl ester (for instance, vinyl acetate), acrylonitrile, olefin, styrene, and the like. These may be employed individually or in combination. Further, together with these, acrylic acid, methacrylic acid, α,β-unsaturated dicarboxylic acid, hydroxyalkyl acrylate, hydroxyalkyl methacrylate, styrene-sulfonic acid, and the like may be employed individually or in combination.

The protective layer in the photosensitive element in the present invention is comprised of hydrophilic polymers such as gelatin and the like. Matting agents such as polymethyl methacrylate latex, silica, and the like, described in Japanese Patent Publication Open to Public Inspection Nos. 61-47946 and 61-75338, and slipping agents may be incorporated into said protective layer.

For the purpose to provide a filter or to minimize irradiation, dyes or UV absorbers may be incorporated into the silver halide emulsion layer and other hydrophilic colloidal layers of the photosensitive element of the present invention. In addition, antistatic agents and plasticizers may be incorporated into the photosensitive element of the present invention.

The image receiving element of the present invention is prepared by applying an image receiving layer comprising silver precipitation nuclei onto a support such as baryta paper, cellulose triacetate, polyester compounds and the like. Such an image receiving element can be preferably prepared by applying a suitable cellulose ester (for example, cellulose diacetate) composition, into which silver precipitation nuclei are dispersed, onto a support, which is subbed, if desired. The resulting cellulose ester layer is subjected to alkaline hydrolysis so that at least a part of the cellulose ester is converted to cellulose in the depth direction. Preferably employed as alkaline solutions for the alkaline hydrolysis is a solution comprising lithium hydroxide together with sodium hydroxide or a solution comprising lithium hydroxide together with potassium hydroxide. These alkalis are preferably dissolved in methanol or ethanol. The added amount of alkalis is preferably between 0.1 and 3 moles per liter of the alkaline solution, and is most preferably between 0.5 and 2 moles. Further, glycerin is preferably added to said alkaline solution.

Listed as specific examples of silver precipitation nuclei are, for instance, iron, lead, zinc, nickel, cadmium, tin, chromium, copper, cobalt, or noble metals such as gold, silver (including fine colloidal silver), platinum, palladium and the like. Further, are preferably employed, and sulfide salts of heavy metals and noble metals, selenide salts thereof, such as sulfide salts of copper, aluminum, zinc, cobalt, nickel, silver, lead, antimony, bismuth, selenium, magnesium, gold, platinum, palladium, and the like, and selenide salts of lead, zinc, antimony, nickel, and the like. Further, prefogged silver halide grains can preferably be employed which are reduced by development to form silver metal which may be employed as the silver precipitation nuclei.

In order to improve the color and stability of a transferred image or other photographic performance, at least one or more mercapto compounds are preferably incorporated into the silver precipitation nuclei layer and/or cellulose ester under said silver precipitation nuclei layer, which has not been subjected hydrolysis, for example, a portion of cellulose ester layer comprising cellulose diacetate, which has not been subjected to hydrolysis. Said mercapto compounds are preferably those described in Japanese Patent Publication Open to Public Inspection No.49-120634, Japanese Patent Publication No. 56-44418, British Patent No. 1,276, 961, Japanese Patent Publication No. 56-21140, and Japanese Patent Publication Open to Public Inspection Nos. 59-231537 and 60-122039.

Further, it is preferable to provide an acidic layer for neutralization (neutralizing layer) between the image receiving layer and the support. For example, polymer acids, which are described in U.S. Pat. No. 3,594,164 and the like, are employed. Cited as preferable polymer acids are maleic anhydride copolymers (for instance, styrene-maleic anhydride copolymers, methyl vinyl ether-maleic anhydride copolymers, ethylene-maleic anhydride copolymers) and acrylic acid or methacrylic acid copolymers (for instance, acrylic acid-alkyl acrylate copolymers, acrylic acid-alkyl methacrylate copolymers, methacrylic acid-alkyl acrylate copolymers, methacrylic acid-alkyl methacrylate copolymers). In addition, polymers comprising sulfonic acids such as acetal compounds of polyvinyl alcohol with polyethylenesulfonic acid, benzaldehydesulfonic acid are also employed. Further, the neutralizing layer may comprise mercapto compounds which are employed in the layer which is not yet saponified.

Further, for the purpose to improve physical properties, hydrolizable non-alkaline-penetrating or alkaline-penetrating polymers may be employed upon mixing with these polymers. Still further, in order to enhance the image stability, the image receiving layer preferably comprises an image stabilizing layer. Preferred as such stabilizing agents are cationic polymer electrolytes. Particularly preferred are water-dispersed latexes described in Japanese Patent Publication Open to Public Inspection No. 59-166940, U.S. Pat. No. 3,958,995, Japanese Patent Publication Open to Public Inspection Nos. 55-142339, 54-126027, 54-155835, and 53-30328; polyvinylpyridnium salts described in U.S. Pat. Nos. 2,548,564, 3,148,061, and 3,756,814; water-soluble quaternary ammonium salt polymers described in U.S. Pat. No. 3,709,690; and water-insoluble quaternary ammonium salt polymers descried in U.S. Pat. No. 3,898,088. Further, as binders in the image stabilizing layer, cellulose acetate is preferably employed and cellulose diacetate having a degree of acetylation of 40 to 49 percent is particularly preferred. Said image stabilizing layer is preferably provided between the aforementioned neutralizing layer and the non-saponified layer. Still further, for the purpose to minimize light piping, white pigments (for example, titanium dioxide, silicone dioxide, kaolin, zinc dioxide, barium sulfate) may be incorporated into the non-saponified layer as well as the neutralizing layer.

In order to minimize the adhesion of a processing solution on the surface of an image receiving layer during peeling after spreading said processing solution, it is preferred to provide a peeling layer on the surface of said image receiving layer. As such peeling layers may be employed gum arabic, hydroxyethyl cellulose, carboxymetyl cellulose, polyvinyl alcohol, polyacryl amide, sodium alginate, and, in addition, compounds described in U.S. Pat. Nos. 3,772,024, and 3,820,999, and British Patent No. 1,360,653. Light shielding methods includes a method in which light shielding materials (for example, carbon black, organic black pigments, and the like) are incorporated into paper as the support, and a method in which the aforementioned light shielding agents are applied onto the rear surface of the support, and further, in order to obtain more whiteness, white pigments (for example, titanium dioxide, silicone dioxide, kaolin, zinc dioxide, barium sulfate) are preferably applied onto to the resulting coating.

For the purpose to minimize curl and to improve brittleness, wetting agents such as glycerin and the like and layer quality improving agents may be incorporated. Further, a protective layer is preferably provided on the uppermost surface of these layers. By incorporating matting agents into said protective layer, it is possible to improve adhesion properties as well as writability. Employed as binders in the aforementioned light shielding layer as well as protective layer are gelatin, cellulose esters, polyvinyl alcohols, and the like.

The alkaline processing composition employed in the present invention comprises developing agents, silver halide solvents, and alkalis as the main components. The developing agents include benzene derivatives (for example, hydroquinone, pyrogallol, metol, glycine, amidol, and p-aminophenol) in which para or ortho positions are substituted with at least two hydroxyl groups and/or amino groups, and hydroxylamines, particularly N-substituted primary aliphatic amines, N-substituted secondary aliphatic amines, N-substituted aromatic amines or β-hydroxylamines, for example, hydroxylamine, N-methylhydroxylamine, N-ethylhydroxylamine, compounds described in U.S. Pat. No. 2,857,276, N-alkoxyl-substitured hydroxylamines described in U.S. Pat No. 3,293,034. Further, hydroxylamine derivatives having a tetrahydrofurfuryl group described in Japanese Patent Publication Open to Public Inspection No. 49-88521 are also employed. Further, aminoreductons described in West Germany Patent application (OLS) Nos. 2,009,054, 2,009,055, and 2,009,078, and heterocyclic aminoreductons described in U.S. Pat. No. 3,615,440 are also employed. Further, tetraalkylreductic acids described in U.S. Pat. No. 3,615,440 may also be employed.

The added amount of these developing agents is preferably between $0.5 \times 10^{-2}$ and $5 \times 10^{-2}$ mole per 100 g of the alkaline processing composition. Along with said developing agents, employed as auxiliary developing agents may be phenidone, p-aminophenol, and reductions. Phenidone is most preferably employed in combination. The added amount of these auxiliary developing agents is preferably between $2 \times 10^{-3}$ and $5 \times 10^{-3}$ mole per 100 g of the alkaline processing composition.

Listed as silver halide solvents employing in the present invention may be thiosulfate salts, thiocyanate salts, uracil and derivatives thereof, compounds described in U.S. Pat. No. 2,543,181, combinations of thioether compounds and cyclic imides with nitrogen bases, and combinations described in U.S. Pat. No. 2,857,274. Further, 1,1-bissulfonylalakane and derivatives thereof may also be employed as the silver halide solvent. The added amount of these silver halide solvents is preferably between $5 \times 10^{-4}$ and $5 \times 10^{-1}$ mole per 100 g of the alkaline processing composition, and is most preferably between $1 \times 10^{-3}$ and $5 \times 10^{-2}$ mole. In order to spread an alkaline processing composition between the photosensitive element and the image receiving element in contact with each other, the alkaline processing composition of the present invention preferably comprises polymer film forming agents or viscosity increasing agents. Hydroxyethyl cellulose as well as carboxymethyl cellulose is particularly useful for this purpose, and those are incorporated into the processing composition in an added amount of providing suitable viscosity. Furthermore, the processing composition may comprise aids known in the art of the silver salt diffusion transfer method, such as antifoggants, stabilizers, toning agents and the like. Employed as these aids may be compounds described in Japanese Patent Publication Open to Public Inspection No. 2-146542 and the like. For the purpose to minimize the processing temperature dependence of the photographic performance, as well as to minimize silvering of transferred images, mercaptoimidazole compounds are preferably incorporated into the alkaline processing composition. By adding iodides to the alkaline processing composition, variation in photographic performance of said composition, when stored, may be minimized.

EXAMPLES

1. Preparation of Photosensitive Element

A photosensitive element was prepared by applying each layer described below onto a subbed support (PET).

| (1) Photosensitive Layer | |
|---|---|
| Cubic silver iodobromide grains subjected to gold/sulfur sensitization (having an average grain diameter of 0.25 μm, an AgI content of 0.5 mole percent), as silver | 1.0 g/m² |
| 4-Hydroxy-6-methyl-1,3,3a,7-tetraazaindene | 0.02 g/m² |
| Sensitizing Dye-A | 1.3 × 10⁻⁴ g/m² |
| Gelatin | 3.6 g/m² |
| Sensitizing Dye-A | |

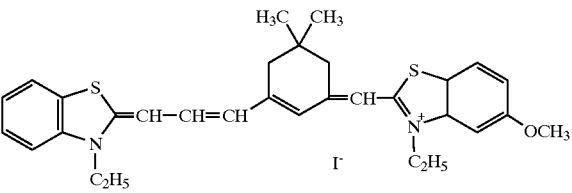

| (2) Protective Layer | |
|---|---|
| Gelatin | 0.8 g/m² |
| Polymethyl methacrylate particles (having an average diameter of 5 μm) | 0.1 g/m² |
| Sodium dihexylsulfosuccinate | 0.02 g/m² |
| Bis(vinylsulfonyl) methyl ether | 0.01 g/m² |
| (3) Backing Layer | |
| (3-1) Light Shielding Layer | |
| Carbon black | 4.5 g/m² |
| Gelatin | 2.0 g/m² |
| (3-2) Protective Layer | |
| Gelatin | 0.8 g/m² |
| Polymethyl methacrylate particles (having an average diameter of 5 μm) | 0.1 g/m² |
| Sodium dihexysulfosuccinate | 0.02 g/m² |
| Bis(vinylsulfonyl)methyl ether | 0.01 g/m² |

2. Preparation of Image Receiving Element

An image receiving element was prepared by successively proving layers described below on polyethylene laminated paper.

| (1) Neutralizing Layer | |
|---|---|
| Cellulose acetate (having a degree of acetylation of 55 percent | 6.5 g/m² |
| Methyl vinyl ether-maleic anhydride copolymer | 4.5 g/m² |
| 1-(4-hexylcarbamoylphenyl)-2-mercaptoimidazole | 0.3 g/m² |
| (2) Image Stabilizing Layer | |
| Cellulose acetate (having a degree of acetylation of 46 percent) | 5.0 g/m² |
| Polymer P | 2.2 g/m² |

P:

x:y:z = 5:47.5:47.5

| (3) Timing Layer | |
|---|---|
| Cellulose acetate (having a degree of acetylation of 55 percent) | 8 g/m² |
| (4) Image Receiving Layer | |
| Cellulose acetate (having a degree of acetylation of 55 percent) | 2 g/m² |
| Palladium sulfide colloid | 1.0 × 10⁻³ g/m² |
| 1-(4-Hexylcarbamoylphenyl)-2-mercaptoimidazole | 0.01 g/m² |

(5) Saponification

The surface was subjected to saponification employing a solution prepared by mixing 10 g of sodium hydroxide, 20 g of glycerin and 240 ml of methanol and washed with water.

| (6) Peeling Layer | |
|---|---|
| Butyl methacrylate-acrylic acid copolymer (having a mole ratio of 15:18) | 0.1 g/m² |

(7) Backing Layer

The light shielding layer and a protective layer were applied onto the surface of the aforementioned support.

| (7-1) | Light shielding Layer | |
|---|---|---|
| | Carbon black | 4 g/m² |
| | Gelatin | 8 g/m² |
| (7-2) | White Layer | |
| | Titanium dioxide | 6 g/m² |
| | Gelatin | 0.8 g/m² |
| (7-3) | Protective Layer | |
| | Polymethyl methacrylate particles (having an average diameter of 5 μm) | 0.2 g/m² |
| | Gelatin | 1.6 g/m² |
| | Sodium dihexysulfosuccinate | 0.02 g/m² |
| | Bis (vinylsulfonyl) methyl ether | 0.03 g/m² |

3. Preparation of Processing Composition

An alkaline processing composition was prepared under a stream of nitrogen according to the formula described below. After preparation, the processing composition in a breakable vessel was filled and the processing composition was prepared.

| Composition | Added Amount |
|---|---|
| Uracil | 70 g |
| Tetrahydropyrimidinethion | 0.15 g |
| Potassium hydroxide | 220 g |
| Triethanolamine | 4.5 g |
| 1-Hydrooxyethylidene-1, 1-diphosphoric acid (60% aqueous solution) | 12 g |
| Hydroxyethyl cellulose | 35 g |
| Zinc nitrate · 9H2O | 30 g |
| Potassium iodide | 0.8 g |
| N,N-bis (methoxyethyl) hydroxylamine (17% aqueous solution) | 170 g |
| 4-Methyl-4hydroxymethyl-1-phenyl- | 7 g |

-continued

| Composition | Added Amount |
| --- | --- |
| 3-pyrazolidinone | |
| Titanium dioxide | 3.8 g |
| Water to make | 1000 ml |

4. Processing

X-ray image information (bone image of a foot portion) was exposed to the aforementioned photosensitive element employing an 820 nm semiconductor laser scanner. A sample in combination of an image receiving element and a processing composition was processed at 25° C. so that the processing composition was spread to form a liquid thickness of 35 μm. Then after 15 seconds, each sample was peeled apart. An X-ray image, which exhibited excellent sharpness as well as graininess, obtained.

What is claimed is:

1. A radiation image detecting device, comprising:
   a scintillator having an area and emitting light in accordance with an intensity of radiation energy when being irradiated with radiation;
   a lens array in which a plurality of lens units are arranged in a form of an array, corresponding to the area of the scintillator so that the light emitted from the scintillator passes through the lens array; and
   a plurality of area sensors corresponding to the plurality of lens units of the lens array, the plurality of area sensors receiving the light having passed through the plurality of lens units and converting the light into electric signals,
   wherein the scintillator, the lens array and the plurality of area sensors are arranged in that order, and
   wherein each lens unit of the plurality of lens units has a magnification of 1/20 to 1/1.5.

2. The radiation image detecting device of claim 1, wherein the lattice has a opaque member.

3. The radiation image detecting device of claim 2, wherein a transmissivity of light having a wavelength of 400 mn to 700 mn for the lattice is not larger than 10% of an amount of the light entering the lattice.

4. The radiation image detecting device of claim 1, wherein the scintillator emits visible light in accordance with an intensity of radiation energy.

5. The radiation image detecting device of claim 4, wherein the scintillator contains gadolium oxysulfide or cesium iodide.

6. The radiation image detecting device of claim 1, wherein each lens unit in the lens array comprises plural lenses.

7. The radiation image detecting device of claim 6, wherein an effective F-number of the each lens unit is not larger than 8.

8. The radiation image detecting device of claim 6, wherein a difference of MTF between a center and a periphery on a plane formed by the each lens unit is not larger than 30% of the MTF of the center or the MTF of the periphery on the plane.

9. The radiation image detecting device of claim 6, wherein a half field angle of the each lens unit is not more than 35°.

10. The radiation image detecting device of claim 6, wherein the each lens unit comprises a focusing means.

11. The radiation image detecting device of claim 6, wherein the each lens unit contains Pb by 0.47 wt % or more and less than 69 wt % of a total weight of glass components of the each lens unit.

12. The radiation image detecting device of claim 6, wherein the each lens unit contains PbO by 0.5 wt % or more and less than 75 wt % of a total weight of glass components of the each lens unit.

13. The radiation image detecting device of claim 1, wherein the area sensors comprises a solid-state image acquiring unit.

14. The radiation image detecting device of claim 13, wherein the solid-state image acquiring unit includes a CCD and a CMOS sensor.

15. The radiation image detecting device of claim 1, further comprising a transparent member provided between the scintillator and the lens array.

16. The radiation image detecting device of claim 15, wherein the transparent member comprises a glass and the transparent member contains Pb by 0.47 wt % or more and less than 69 wt % of a total weight of glass components of the transparent member.

17. The radiation image detecting device of claim 1, wherein each area sensor of the plurality of area sensors has an imaging area to receive light and outputs image signals of pixels corresponding to the imaging area, and wherein a part of the imaging area is used as an effective imaging area to output image signals and the effective imaging area is 5% to 99% of the imaging area.

18. The radiation image detecting device of claim 17, wherein the effective imaging area is 50% to 90% of the imaging area.

19. A radiation image detecting device, comprising:a scintillator to emit light in accordance with an intensity of radiation energy when being irradiated with radiation;
   a lens array comprising a plurality of lens unit, wherein the light emitted from the scintillator passes through the lens array; and
   a plurality of area sensors corresponding to the plurality of lens unit of the lens array, the plurality of area sensors receiving the light having passed through the plurality of lens units and converting the light into electric signals,
   wherein the scintillator, the lens array and the area sensors are arranged in this order and a focus length f (mm) of each lens unit satisfies the following formula:

$2<f<20.$

* * * * *

UNITED STATES PATENT AND TRADEMARK OFFICE
CERTIFICATE OF CORRECTION

| | |
|---|---|
| PATENT NO. | : 6,472,665 B1 |
| APPLICATION NO. | : 09/502576 |
| DATED | : October 29, 2002 |
| INVENTOR(S) | : Akira Ishisaka et al. |

It is certified that error appears in the above-identified patent and that said Letters Patent is hereby corrected as shown below:

Column 1:
Line 11 after "as", delete "s" and insert therefor --a--.

Column 2:
Line 54 after "sensors", delete "comprises" and insert therefor --comprise--.

Column 4:
Line 47 after "made of", insert --a--.

Column 5:
Line 12 after "is", delete "a" and insert therefor --an--.
Line 16 before "image", delete "a" and insert therefor --an--.

Column 9:
Line 26 after "sensor", delete "in" and insert therefor --In--.

Column 11:
Line 2 before "EMBODIMENT", delete "PROFFERED" and insert therefor --PREFERRED--.
Line 47 after "detector", delete "." And insert therefor --,--.

Column 14:
Line 2 after "with", delete "a".
Line 66 after "after", delete "an" and insert therefor --a--.

Column 15:
Line 27 after "agree", insert --with--.

Column 18:
Line 19 after "there", delete "are" and insert therefor --is--.

Column 19:
Line 10 after "conducting", delete "these".
Line 17 after "image", delete "processing" and insert therefor --processings--.
Line 18 after "from", delete "an".
Line 39 after "also", delete "of".

Column 21:
Line 44 after "and", delete "nor" and insert therefor --not--.

UNITED STATES PATENT AND TRADEMARK OFFICE
CERTIFICATE OF CORRECTION

PATENT NO. : 6,472,665 B1
APPLICATION NO. : 09/502576
DATED : October 29, 2002
INVENTOR(S) : Akira Ishisaka et al.

It is certified that error appears in the above-identified patent and that said Letters Patent is hereby corrected as shown below:

Column 22:
Line 50 after "3:", delete "$[Rh(NO)_2Cl_4]^-$" and insert therefor --$[Rh(NO)_2Cl_4]^-$--.

Column 23:
Line 2 after "19:", delete "$[OsCl_6]^{3-}$" and insert there for --$[OsCl_6]^{3-}$--.
Line 7 after "24:", delete "$[Ir(NO)Cl_5]_2$." and insert therefor --$[Ir(NO)Cl_5]^{2-}$--.
Line 9 after "are", delete "preferable" and insert therefor --preferably--.

Column 24:
Line 43 after "divided", insert --into--.
Line 43 after "several", delete "portion" and insert therefor --portions--.
Line 56 after "be", insert --used--.
Line 59 after "invention", delete "at".

Column 26:
Line 49 after "subjected", insert --to--.

Column 31:
Line 41 before "to", delete "mn" and insert therefor --nm--.
Line 41 after "700", delete "mn" and insert therefor --nm--.

Column 32:
Line 15 after "sensors", delete "comprises" and insert therefor --comprise--.

Signed and Sealed this

Twenty-second Day of May, 2007

JON W. DUDAS
*Director of the United States Patent and Trademark Office*